(12) United States Patent
Chen et al.

(10) Patent No.: US 8,878,808 B2
(45) Date of Patent: Nov. 4, 2014

(54) SENSING MODULE WHICH CAN PERFORM PROXIMITY DETECTION AND DISPLAY STRUCTURE HAVING SENSING ELECTRODES

(71) Applicant: AU Optronics Corp., Hsin-Chu (TW)

(72) Inventors: Chi-Cheng Chen, Hsin-Chu (TW);
Chao-Chen Wang, Hsin-Chu (TW);
Kyaw Kyaw Tun, Hsin-Chu (TV);
Chih-Hao Hu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 104 days.

(21) Appl. No.: 13/798,167

(22) Filed: Mar. 13, 2013

(65) Prior Publication Data

US 2013/0271396 A1    Oct. 17, 2013

(30) Foreign Application Priority Data

Apr. 13, 2012  (TW) .............................. 101113409 A

(51) Int. Cl.
*G06F 3/041*        (2006.01)
*G06F 3/044*        (2006.01)

(52) U.S. Cl.
CPC .... *G06F 3/0416* (2013.01); *G06F 2203/04101* (2013.01); *G06F 3/044* (2013.01)
USPC ............ 345/173; 345/204; 345/104; 345/103

(58) Field of Classification Search
None
See application file for complete search history.

(56) References Cited

U.S. PATENT DOCUMENTS

| 8,284,165 | B2* | 10/2012 | Koshiyama et al. .......... 345/173 |
| 2010/0149126 | A1 | 6/2010 | Futter |
| 2010/0295804 | A1* | 11/2010 | Takeuchi et al. .............. 345/173 |
| 2011/0096024 | A1 | 4/2011 | Kwak |
| 2011/0120784 | A1 | 5/2011 | Osoinach et al. |
| 2011/0267296 | A1* | 11/2011 | Noguchi et al. ............... 345/173 |

* cited by examiner

*Primary Examiner* — Muhammad N Edun
(74) *Attorney, Agent, or Firm* — Winston Hsu; Scott Margo

(57) ABSTRACT

A display includes a display module and a sensing module including a proximity sensing electrode, a set of sensing electrodes, a touch circuit, a proximity circuit and a processor. The sensing electrodes are configured to sense a touch input during a first period and sense a proximity input during a second period. The touch circuit is coupled to the sensing electrodes for controlling the sensing electrodes to sense the touch input in the first period, and converting a two-dimensional analog touch signal transmitted from the set of the sensing electrodes to a two-dimensional digital touch signal. The proximity circuit is coupled to the sensing electrodes and the proximity sensing electrode for controlling the sensing electrodes and the proximity sensing electrode to sense the proximity input, and converting a three-dimensional analog proximity signal transmitted from the set of sensing electrodes and proximity unit to a three-dimensional digital proximity signal.

21 Claims, 19 Drawing Sheets

SENSING MODULE WHICH CAN PERFORM PROXIMITY DETECTION AND DISPLAY STRUCTURE HAVING SENSING ELECTRODES

BACKGROUND OF THE INVENTION

1. Technical Field

The present invention relates to a display, especially relating to a display having touch and proximity sensing functions.

2. Description of the Prior Art

Due to their slim shapes, low power dissipation and low radiation, liquid crystal displays (LCDs) are widely applied in mobile electronic devices such as notebooks, monitors, and PDAs (personal digital assistants). Liquid crystal displays having a touch input function are also widely applied on more and more electronic devices as input interfaces. Touch displays include resistive touch displays and capacitive touch displays. Compared with the resistive touch displays, capacitive touch displays are more convenient to operate because capacitive touch displays have functions of multiple points touch input.

However, when operating a resistive or a capacitive touch display, a user must directly contact the screen of the touch display through fingers. This causes a lot of bacteria to easily gather on the surface of the touch display, and the bacteria will be transferred between many users. For example, treadmills having touch displays are widely seen in gyms, and people in the same gym may spread bacteria to each other. On the contrary, through performing proximity inputs, users can perform input commands without physically contacting the touch devices, and the input commands can also generated according to horizontal and vertical distances between a user and a proximity sensing device. However, compared with direct physical touch input, the accuracy of sensing the proximity input is relative low.

SUMMARY

An embodiment of the present invention relates to a display having functions of touch and proximity sensing. The display comprises a display module and a sensing module. The display module is used for displaying images. The sensing module is stacked with the display module and comprises a proximity sensing electrode, a first set of sensing electrodes, a touch circuit, a proximity circuit and a processor. The first set of sensing electrodes comprises a plurality of first sensing electrodes configured at a side of the proximity sensing electrode for sensing a touch input during a first period to provide a two-dimensional analog touch signal for indicating a location of the touch input in two dimensions, and sensing a first proximity input with four first electrodes and the proximity sensing electrode during a second period to provide a three-dimensional analog proximity signal for indicating a location of the proximity input in three dimensions. The four first electrodes are selected from the first sensing electrodes and determine a first area on the sensing module. The touch circuit is coupled to the first sensing electrodes of the first set of sensing electrodes for controlling the first sensing electrodes to sense the touch input during the first period, receiving the two-dimensional analog touch signal, and converting the two-dimensional analog touch signal to a two-dimensional digital touch signal. The proximity circuit is coupled to the first sensing electrodes of the first set of the sensing electrodes and the proximity sensing electrode for controlling the four first electrodes and the proximity sensing electrode to sense the first proximity input, receiving the three-dimensional analog proximity signal, and converting the three-dimensional analog proximity signal to a three-dimensional digital proximity signal. The processor is coupled to the touch circuit and the proximity circuit for generating corresponding commands according to the two-dimensional digital touch signal and the three-dimensional digital proximity signal transmitted from the proximity circuit.

Another embodiment of the present invention relates to a display structure having sensing electrodes. The display structure comprises a display module and a sensing module stacked with the display module. The sensing module comprises a first set of sensing electrodes and a proximity sensing electrode. The first set of sensing electrodes comprises a plurality of first direction sensing electrodes arranged along a first direction and a plurality of second direction sensing electrodes arranged along a second direction other than the first direction. The proximity sensing electrode is configured at a side of the first set of sensing electrodes, and located at a plane other than the plane where the first set of sensing electrodes is located.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
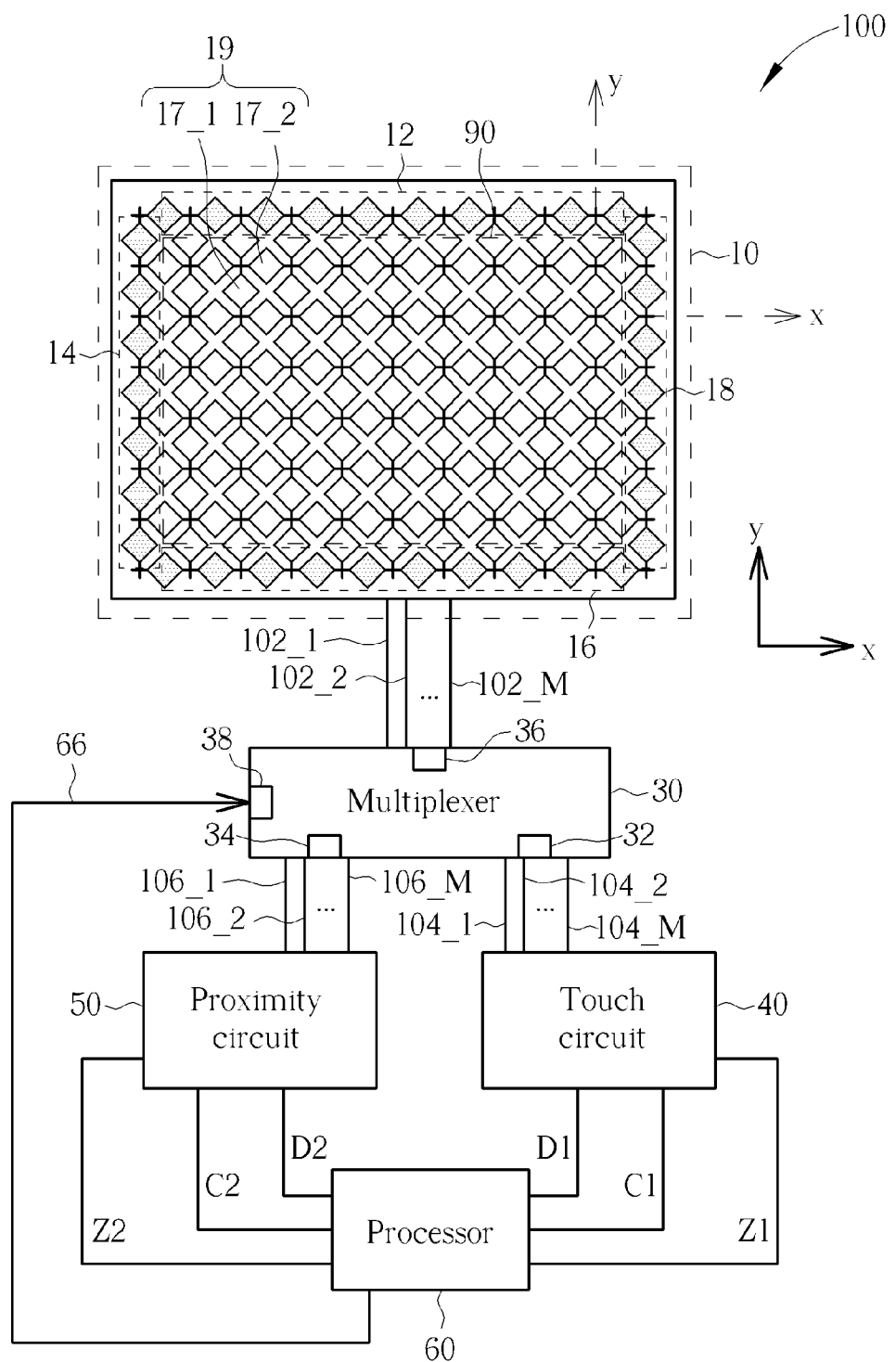
FIG. 1 shows a sensing module of the first embodiment of the present invention.

The detailed descriptions of the present invention are exemplified below in examples. However, the examples are merely used to illustrate the present invention, not to limit the present invention. Because one skilled in the art may modify the present invention or combine the present invention with some features within the scope of the present invention, the claimed scope of the present invention should be referred to in the following claims.

In the entire specification and claims, unless the contents clearly specify the meaning of some terms, the terms "a" or "the" may refer to one or at least one of elements or components. Besides, in the present disclosure, unless it can be clearly seen from the relating context that the examples or embodiments do not refer to multiple elements or components, singular articles may refer to one or at least one of elements or components. The meanings of every term used in the present claims and specification refer to a usual meaning known to one skilled in the art unless the meaning is additionally annotated. Some terms used to describe the present invention will be discussed to guide practitioners about the present invention. Every example in the present specification cannot limit the claimed scope of the present invention.

The terms "substantially," "around," "about" and "approximately" can refer to within 20% of a given value or range, and preferably within 10%.

Further, in the present specification and claims, the term "comprising" is open type and should not be viewed as the term "consisted of." Besides, the term "electrically coupled" may be referring to either directly connecting or indirectly connecting between elements. Thus, if it is described in the below contents of the present invention that a first device is electrically coupled to a second device, the first device may be directly connected to the second device, or indirectly connected to the second device through other devices or means. Moreover, when the transmissions or generations of electrical signals are mentioned, one skilled in the art should understand some degradations or undesirable transformations could be generated during the operations. If it is not specified in the specification, an electrical signal at the transmitting end should be viewed as substantially the same signal as that at the receiving end. For example, when the end A of an electrical circuit provides an electrical signal S to the end B of the electrical circuit, the voltage of the electrical signal S may drop due to passing through the source and drain of a transistor or due to some parasitic capacitance. However, the transistor is not deliberately used to generate the effect of degrading the signal to achieve some result, that is, the signal S at the end A should be viewed as substantially the same as that at the end B.

Furthermore, it can be understood that the terms "comprising," "including," "having," "containing," and "involving" are open-ended terms, which refer to "may include but is not limited to so." Besides, each of the embodiments or claims of the present invention is not necessary to achieve all the effects and advantages possibly to be generated, and the abstract and title of the present invention is used to assist for patent search and is not used to further limit the claimed scope of the present invention.

The embodiments and figures are provided as follows in order to illustrate the present invention in detail, but please notice that the claimed scope of the present invention is not limited by the provided embodiments and figures.

Figure 2:
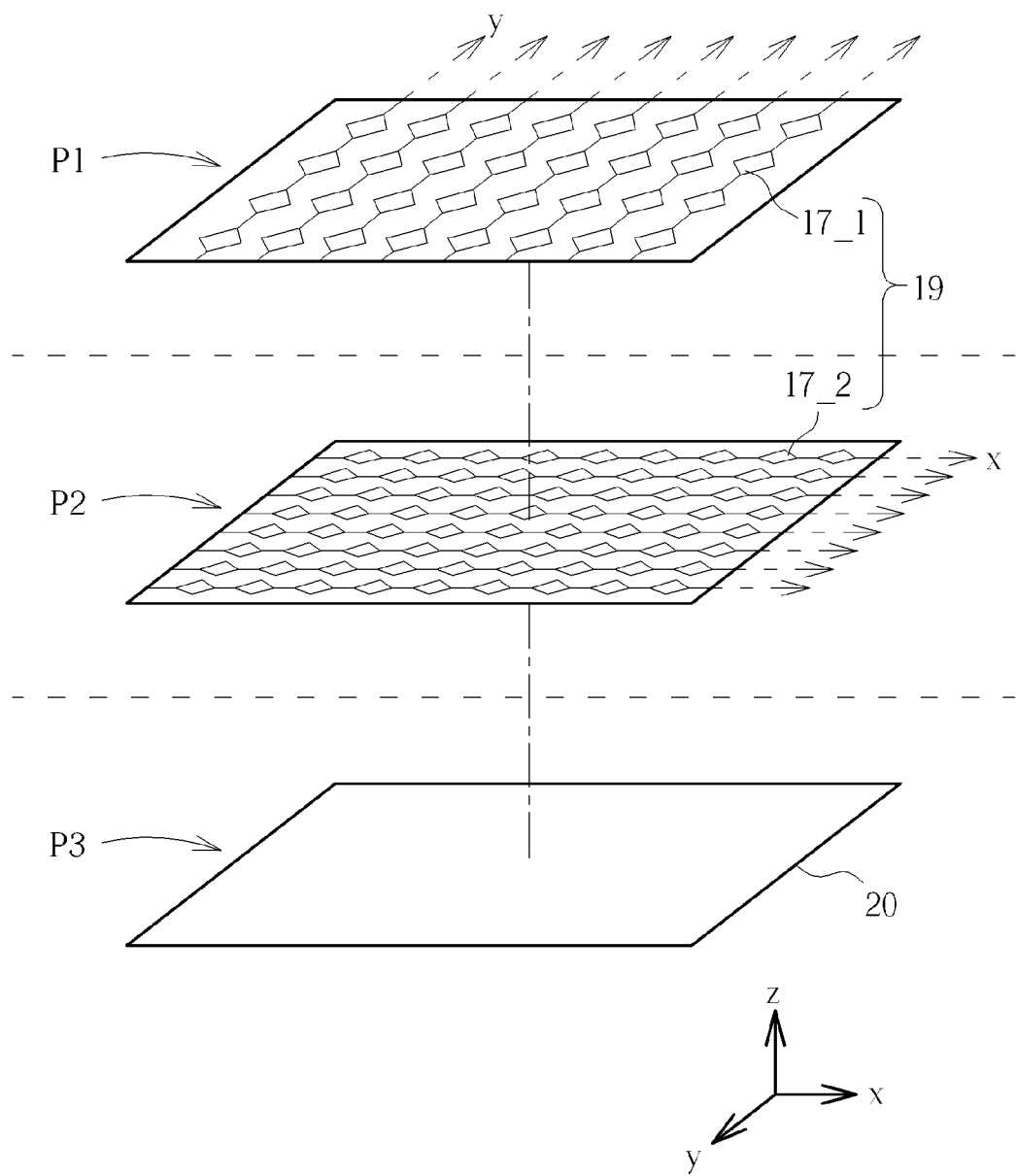
FIG. 2 shows the structure of the sensing modules in FIG. 1 to FIG. 7A and FIG. 13 to FIG. 15.

Please refer to FIGS. 1 and 2. FIG. 1 shows a sensing module 100 of the first embodiment of the present invention. FIG. 2 shows the structure of the sensing module 100 in FIG. 1 to FIG. 7A and FIG. 13 to FIG. 15. The sensing module 100 is capable of sensing touch input and sensing proximity input. Sensing proximity input may be sensing the position changes with time of the gesture of a user in a predetermined distance. In general, sensing proximity input can generate a horizontal sensing result and a vertical sensing result. As shown in FIG. 1 and FIG. 2, the sensing module 100 comprises a first set of sensing electrodes 10, a proximity sensing electrode 20, a multiplexer 30, a touch circuit 40, a proximity circuit 50, a processor 60, a first clock signal trace C1, a first data line D1, a second clock signal trace C2, a second data line D2, a first interrupt signal trace Z1 and a second interrupt signal trace Z2. The first set of sensing electrodes 10 comprises a plurality of first sensing electrodes 19. The first sensing electrodes 10 may be an electrode matrix of any shape and arranged along the x axis or the y axis, and the material of the first set of sensing electrodes 10 may have low resistance and high transmittance, such as Indium-Tin-Oxide (ITO), Indium-Zinc-Oxide, Aluminum-Tin-Oxide, Aluminum-Zinc-Oxide and Indium-Germanium-Zinc-Oxide. The first set of sensing electrodes 10 may be configured at a side of the proximity sensing electrode 20 for sensing a touch input during a first period T1 to provide a two-dimensional analog touch signal, and sensing a first proximity input with four first electrodes 12, 14, 16 and 18 of the first set of sensing electrodes 10 and the proximity sensing electrode 20 during a second period T2 to provide a three-dimensional analog proximity signal. The two-dimensional analog touch signal is for indicating a location of the touch input in two dimensions. The three-dimensional analog proximity signal is for indicating a location of the proximity input in three dimensions. In other word, coordinates of the touch input with two dimensions can be derived according to the two-dimensional analog touch signal, and coordinates of the proximity input with three dimensions can be derived according to the three-dimensional analog proximity signal. The four first electrodes 12, 14, 16 and 18 are selected from the first sensing electrodes 19 and determine a first area 90 on the sensing module 100. Besides, the first set of sensing electrodes 10 may be coupled to the proximity circuit 40 through the multiplexer 30 during the second period T2, and be isolated to the proximity circuit 40 during the period T1.

The input end 36 of the multiplexer 30 is coupled to each electrode of the first set of sensing electrodes 10 and the proximity sensing electrode 20 respectively through the connecting traces 102_1 to 102_M. The touch circuit 40 is coupled to the first output end 32 of the multiplexer 30 respectively through the connecting traces 104_1 to 104_M for controlling the first set of sensing electrodes 10 to sense touch inputs during the first period T1 and to receive the two-dimensional analog touch signals transmitted from the multiplexer 30 when the touch inputs are being sensed by the first set of sensing electrodes 10, and to transfer the two-dimensional analog touch signals transmitted from the multiplexer 30 into two-dimensional digital touch signals. For example, the two-dimensional analog touch signals may be analog sensing values of a plurality of sensing points formed by the plurality of first sensing electrodes 19 of the first set of sensing electrodes 10, and the two-dimensional digital touch signals may be digital sensing values generated via transforming the analog sensing values of a plurality of sensing points formed by the plurality of first sensing electrodes 19 of the first set of sensing electrodes 10. The proximity circuit 50 is coupled to the second output end 34 and the proximity sensing electrode 20 for controlling the first electrodes 12, 14, 16 and 18 and the proximity sensing electrode 20 to sense the first proximity input, and controlling the first electrodes 12, 14, 16 and 18 to receive the three-dimensional analog proximity signals transmitted from the multiplexer 30 when the touch inputs are sensed by the first electrodes 12, 14, 16 and 18. For example, the three-dimensional analog proximity signals may be analog sensing values transmitted from the first electrodes 12, 14 16 and 18, and the three-dimensional digital proximity signals may be digital sensing values generated via transforming the analog sensing values transmitted from the first electrodes 12, 14 16 and 18. Besides, the multiplexer 30 is further configured to determine whether the received signals should be transmitted to the touch circuit 40 or the proximity circuit 50. The processor 60 is coupled to a selecting end 38 of the multiplexer 30 through the controlling trace 66, and is also coupled to the touch circuit 40 and the proximity circuit 50, for controlling the multiplexer 30 to couple the first set of sensing electrodes 10 to the touch circuit 40 and to isolate the first set of sensing electrodes 10 to the proximity circuit 50 during the first period T1, and controlling the multiplexer 30 to couple the first sensing electrodes 12, 14, 16 and 18 to the proximity circuit 50 and to isolate the first sensing electrodes 12, 14, 16 and 18 to the touch circuit 40 during the second period T2. The processor can also generate corresponding commands according to the two-dimensional digital touch signals transmitted from the touch circuit 40 and the three-dimensional digital proximity signals transmitted from the proximity circuit 50. For example, the corresponding commands may be the information indicating a touched positions of the touch input generated via processing the two-dimensional digital touch signals and/or the information including proximity positions generated via processing the three-dimensional digital proximity signals. Further, the touched positions can refer to two-dimensional coordinates (x-axis and y-axis) to indicate what positions of the sensing module 100 are being touched, and the proximity positions can refer to three-dimensional coordinates (x-axis, y-axis and z-axis) to indicate the spatial relationship between the sensing module 100 and the object performing proximity inputs. Moreover, the corresponding commands may be generated according to a single point/multiple points touch input and refer to various image operations, e.g. finger movements as clicking to confirm, rotating the displayed image, and zooming the displayed image to be larger or smaller, and/or be generated according to a single point/multiple point proximity input and refer to various image operations, e.g. a gesture for clicking to confirm, rotating the displayed image, and zooming the displayed image to be larger or smaller.

As shown in FIG. 2, the first sensing electrodes 19 include a plurality of first direction sensing electrodes 17_1 arranged along a first direction in array on a first plane P1 and a plurality of second direction sensing electrodes 17_2 arranged along a second direction in array on a second plane P2 other than the first plane P1. The proximity electrode 20 is configured at a third plane P3 at a side of the second plane P2 opposite to the first plane P1. Although in FIG. 2, the first plane P1, the second plane P2 and the third plane P3 are sequentially arranged along the z axis from the top to the bottom, the present invention does not limit the sequence of the first plane P1, the second plane P2 and the third plane P3. Besides, the first direction sensing electrodes 17_1 and second direction sensing electrodes 17_2 may be disposed on the same plane, and the present invention does not limit the directions of the first direction sensing electrodes 17_1 and second direction sensing electrodes 17_2 to be perpendicular to each other.

As shown in FIG. 1, The first clock signal trace C1 and the first data line D1 are coupled between the touch circuit 40 and the processor 60, and the second clock signal trace C2 and the second data line D2 are coupled between the proximity circuit 50 and the processor 60. The first clock signal trace C1 and the second clock signal trace C2 are configured to transmit clock signals. The first data line D1 is configured to transmit the two-dimensional digital touch signals from the touch circuit 40 to the processor 60, and the second data line D2 is configured to transmit three-dimensional digital proximity signal from the proximity circuit 50 to the processor 60. Further, the first interrupt signal trace Z1 is coupled between the touch circuit 40 and the processor 60 for informing the processor 60 when the transmission of the two-dimensional digital touch signals is finished, and the second interrupt signal trace Z2 is coupled between the proximity circuit 50 and the processor 60 for informing the processor 60 when the transmission of the three-dimensional digital proximity signals is finished.

In FIG. 1, the first area 90 is an area surrounded by the first electrodes 12, 14, 16 and 18, and the sensing module 100 is configured to sense the proximity inputs of a user in a predetermined distance. The first set of electrodes 10 are configured to sense touch inputs. The first electrodes 12, 14, 16 and 18 in the first set of electrodes 10 not only have the function of sensing touch inputs, but also have the function of sensing proximity inputs along with the proximity sensing electrode 20. Because the first electrodes 12, 14, 16 and 18 have the functions sensing touch and proximity inputs, other proximity sensing electrodes are not needed to be set inside or above the first electrodes 12, 14, 16 and 18. Thus, the thickness of the sensing module 100 can be reduced and the element number of the sensing module 100 reduced as well. When the first electrodes 12, 14, 16 and 18 are configured to perform proximity sensing, a three-dimensional coordinate corresponding to fingers of a user and the sensing module 100 can be generated through calculating the distance between the fingers of a user and the first electrodes 12, 14, 16 and 18.

When the multiplexer 30 receives touch signals (including the two-dimensional analog touch signal) transmitted from the first set of sensing electrodes 10 and proximity signals (including the three-dimensional analog proximity signal) transmitted from the first electrodes 12, 14, 16 and 18 and the proximity sensing electrode 20, the multiplexer 30 transmits the received touch signals to the touch circuit 40 and transmits the received proximity signals to the proximity circuit 50. The touch signals transmitted from the first set of sensing electrodes 10 and the proximity signals transmitted from the first electrodes 12, 14, 16 and 18 and the proximity sensing electrode 20 are analog signals. After receiving the analog touch signals, the touch circuit 40 will transform the analog touch signals into digital touch signals (including the two-dimensional digital touch signal), and transmit the digital touch signals to the processor 60. Similarly, after receiving the analog proximity signals, the proximity circuit 50 will transform the analog proximity signals into digital proximity signals (including the three-dimensional digital proximity signal), and transmit the digital proximity signals to the processor 60. The processor 60 will provide commands corresponding to the received digital touch signals and proximity signals.

Because the sensing module 100 is capable of detecting proximity signals, users can operate the sensing module 100 without directly touching the surface of the sensing module 100 with fingers. Thus, the disadvantage of spreading bacteria in related art can be avoided. Further, the sensing module 100 also has touch function, thus meticulous operations can also be performed with the sensing module 100. For example, when inputting alphabetic characters to a small size panel, e.g. a 3 inch touch panel, meticulous operations via directly touching the touch panel is required.

Figure 3:
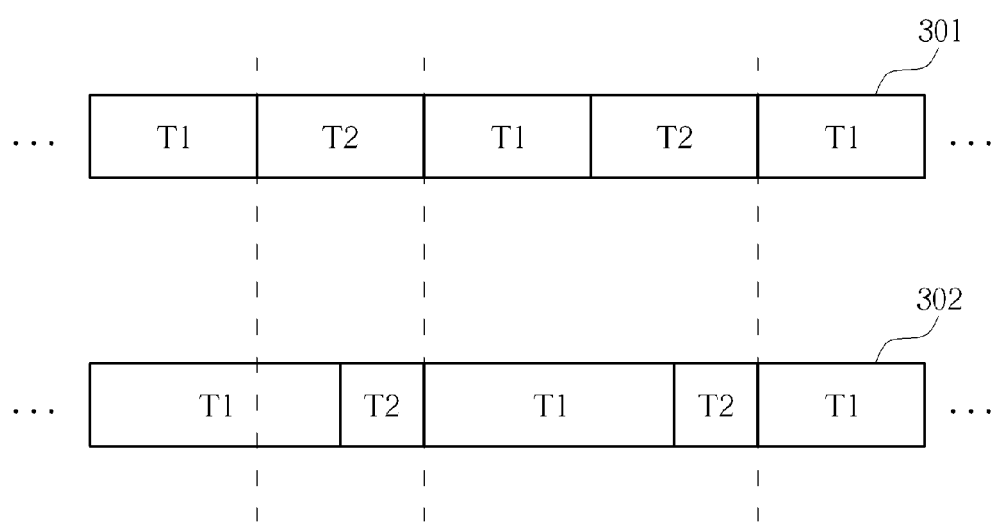
FIG. 3 shows the sensing module in FIG. 1 to be operated alternately in a first period and in a second period.

Please refer to FIG. 3, which shows the sensing module 100 in FIG. 1 to be operated alternately in a first period T1 and in a second period T2. As shown in the timings 301 and 302, the sensing module 100 may be switched alternately correspond to the touch operation in the first period T1 and to correspond to the proximity operation in the second period T2. The switching rate between the touch mode and the proximity mode of the sensing module 100 may be 60 Hz or above. Thus, the touch input and the proximity input can be both sensed by the sensing module 100. However, the present embodiment does not limit the value of the aforementioned switching rate. Besides, the processor 60 can perform detections repeatedly in both the first period T1 and the second period T2, and will control the ratio between the first period T1 and the second period T2 if the first set of sensing electrodes 10 sense touch inputs. In the timing 301, the first period T1 and the second period T2 are set to have the same length and are configured alternate with each other. However, in the timing 302, the first period T1 and the second period T2 are set to have different lengths. For example, when touch inputs are sensed by the first set of sensing electrodes 10 of the sensing module 100 and the sensing module 100 is operated in the first period T1, the first period T1 is extended with a predetermined time, and then the sensing module 100 is switched to be operated in the second period T2, or until no inputs are sensed by the sensing module 100 in the first period T1 then the sensing module 100 is switched to be operated in the second period T2. Further, when the sensing module 100 is operated during the second period T2, if the first set of sensing electrodes 10 sense touch inputs, the timing of the second period T2 switching to the first period T1 may be changed to be earlier. The aforementioned timing switching method is for example, not for limiting the claimed scope of the present invention. Through controlling the time ratio of the first period T1 and the second period t2, the power consumption of the sensing module 100 can be reduced. For example, when a user performs touch inputs to the sensing module 100 for a long time without performing proximity inputs, the proximity circuit 50 may be turn off or be forced to enter into a sleep status to reduce power consumption, or when the user performs proximity inputs to the sensing module 100 for a long time without performing touch inputs, the touch circuit 40 may be turn off or be forced to enter into a sleep status to reduce power consumption.

Figure 4:
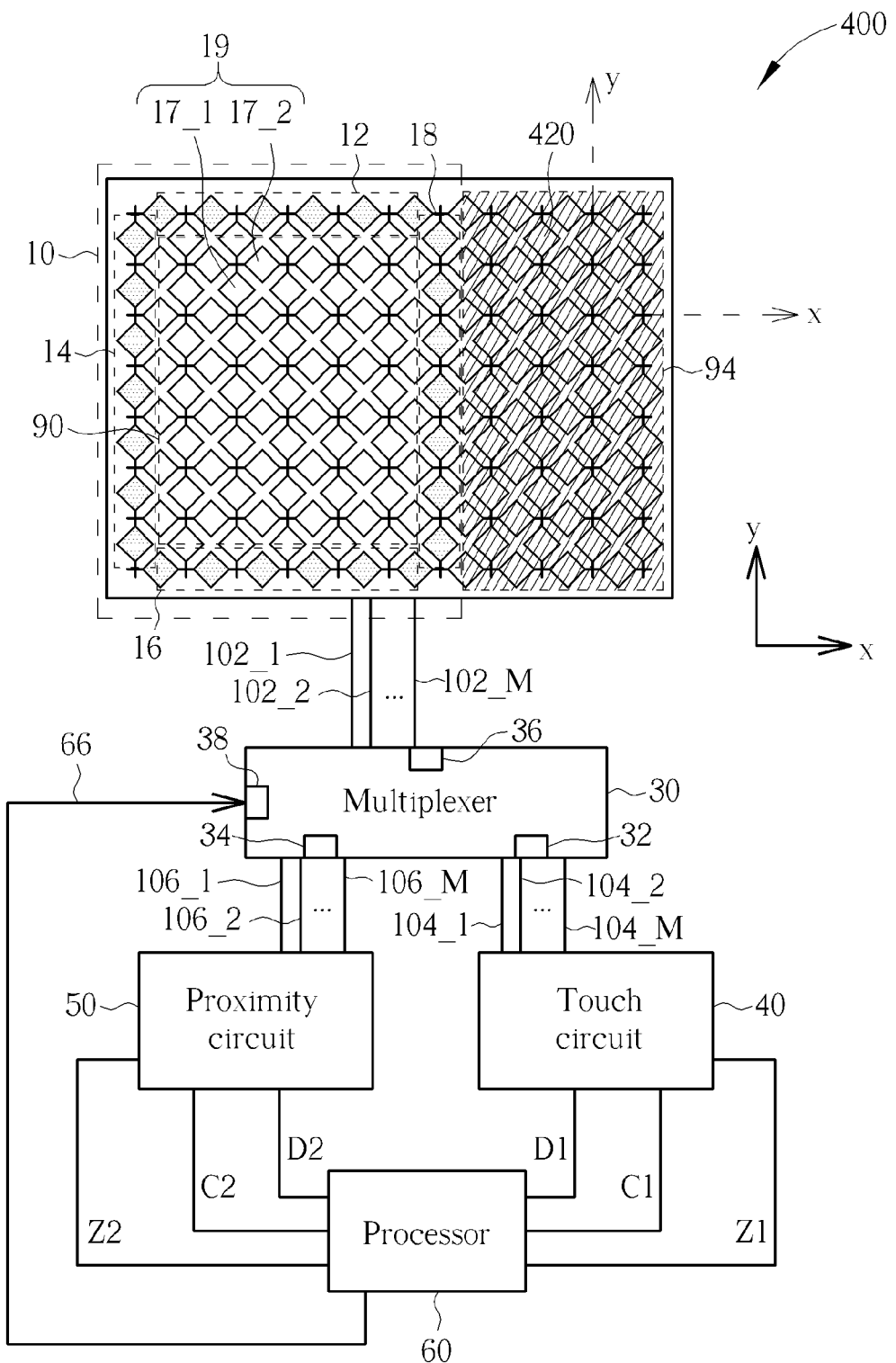
FIG. 4 shows a sensing module of the second embodiment of the present invention.

Please refer to FIG. 4, which shows the sensing module 400 of the second embodiment of the present invention. The difference between the sensing module 400 and the sensing module 100 is that the sensing module 400 further comprises a second set of sensing electrodes 420. The second set of sensing electrodes 420 may be a plurality of electrodes in matrix of any shape, and the material of the matrix may be low resistance and high penetration rate. Besides, the second set of sensing electrodes 420 may be coupled to the proximity circuit 50 for performing proximity inputs to provide three-dimensional analog proximity signals. Further, the sensing module 400 may comprise a proximity region 94 for only sensing proximity inputs, that is, when both of touch and proximity inputs are performed, the proximity region 94 will only sense the proximity inputs and will not be affected by the touch inputs. The second set of electrodes 420 may be directly coupled to the proximity circuit without being coupled to the multiplexer 30 first, because the second set of sensing electrodes 420 are used merely for sensing proximity inputs.

Figure 5A:
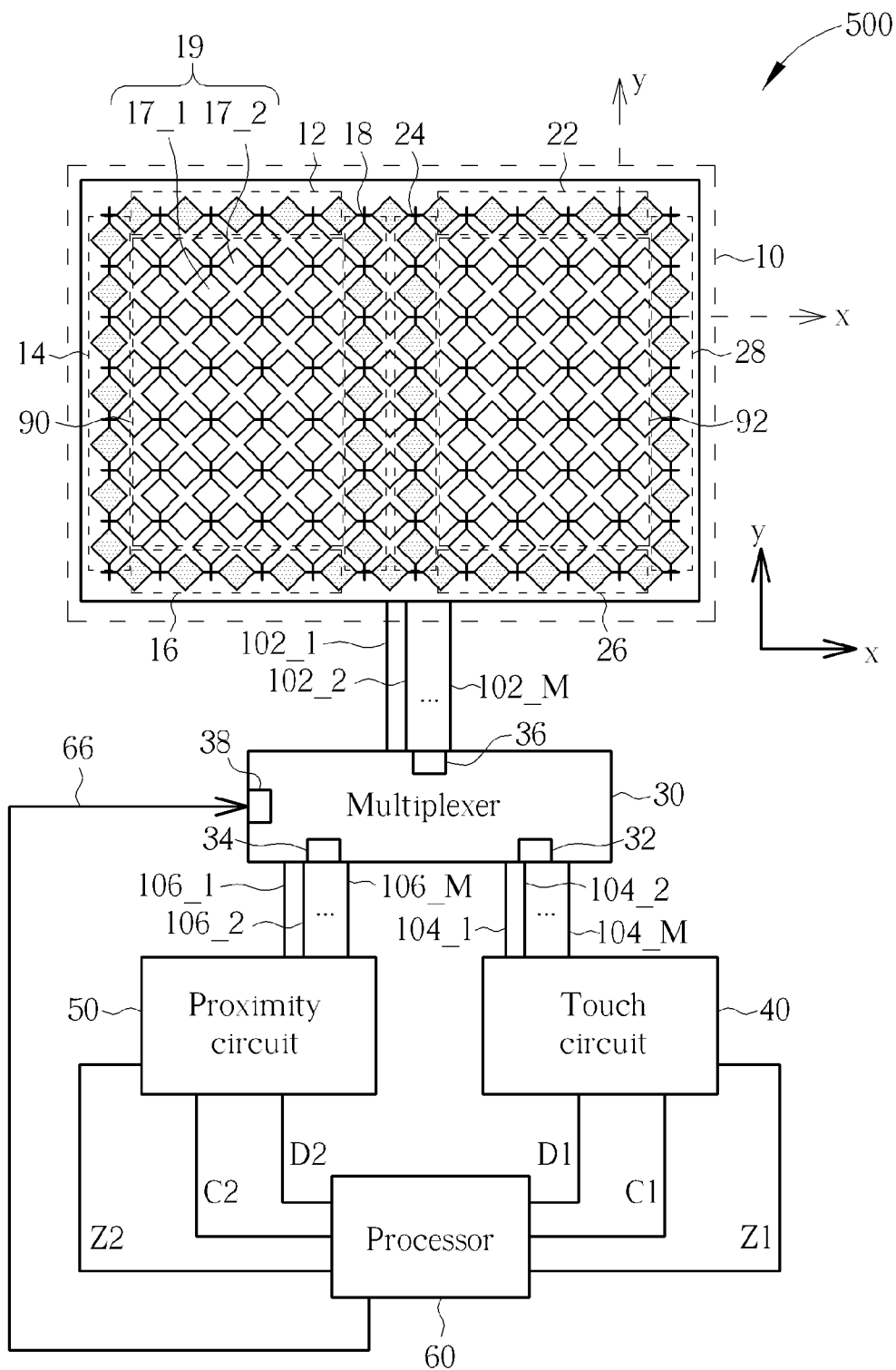
FIG. 5A shows a sensing module of the third embodiment of the present invention.
Figure 5B:
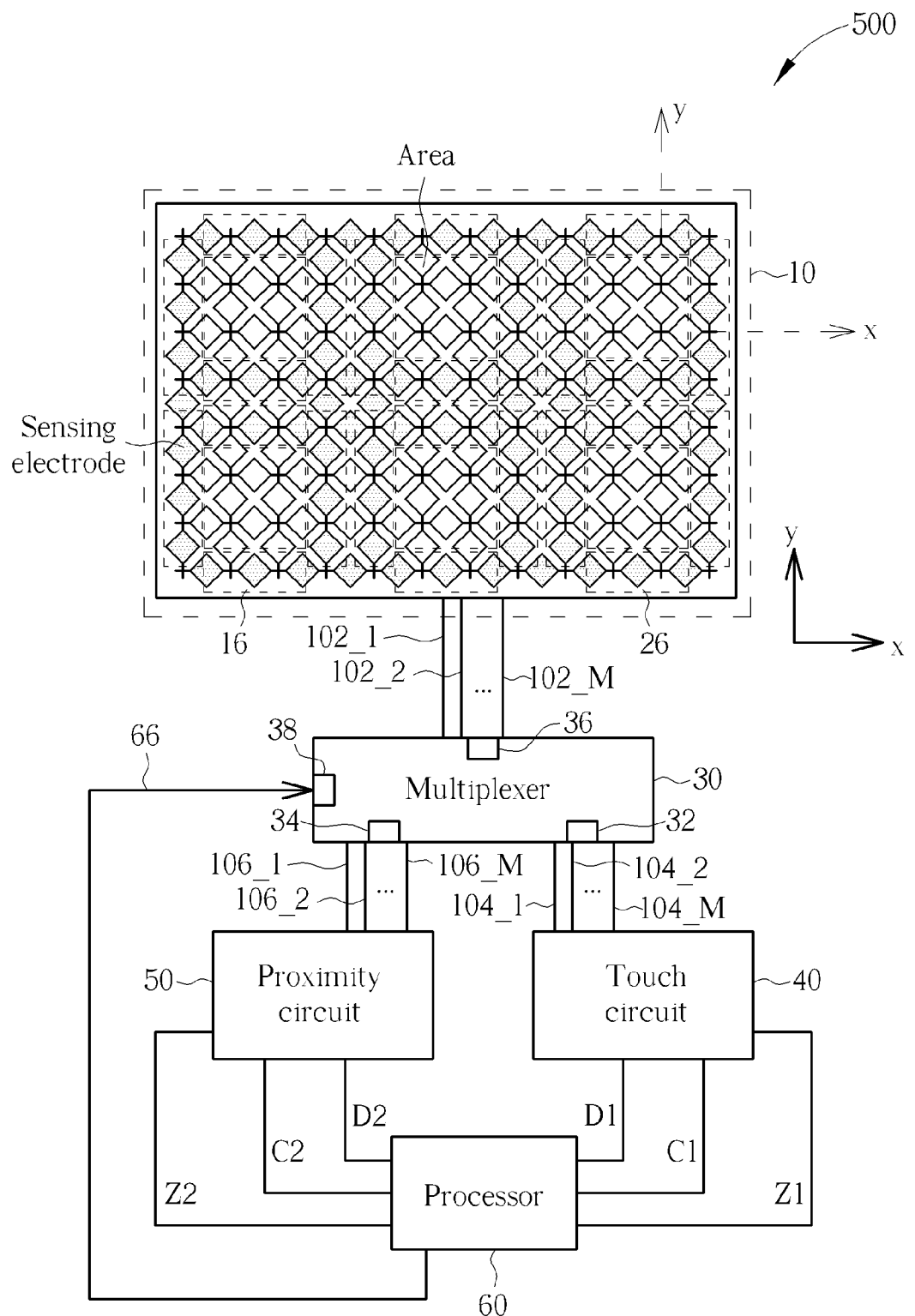
FIG. 5B shows another aspect of the sensing module of the third embodiment of the present invention.

Please refer to FIGS. 5A and 5B. FIG. 5A shows a sensing module 500 of the third embodiment of the present invention, and FIG. 5B shows another aspect of the sensing module 500 of the third embodiment of the present invention. The difference between the third embodiment and the first embodiment is that in the third embodiment, the proximity circuit 50 is also configured to control the four second electrodes 22, 24, 26 and 28 along with the second proximity sensing electrode 20 to sense the second proximity inputs. The four second electrodes 22, 24, 26 and 28 are selected from another four sensing electrodes of the first sensing electrodes 19 of the first set of sensing electrodes 10 other than the four first electrodes 12, 14, 16 and 18. The four second electrodes 22, 24, 26 and 28 determine a second region 92 which does not overlap with the first region 90. The four first electrodes 12, 14, 16 and 18 and the four second electrodes 22, 24, 26 and 28 can be both configured to sense the first proximity inputs to increase the sensing accuracy. Through utilizing the sensing module 500 to sense both the first proximity input and the second proximity input, the multiplexer 60 can generate multi-point commands according to the first proximity input and the second proximity input. Thus, the user can use various gestures to the sensing module 500 to generate various commands without directly touching the sensing module 500. Besides, the four first electrodes 12, 14, 16 and 18 and the four second electrodes 22, 24, 26 and 28 may be configured to be disconnected to each other, for example, the first electrode 12 and the second electrode 22 may be configured to be two separate electrodes rather than one electrode substantially. However, the present invention may comprise the configuration that the first electrode 12 and the second electrode 22 are one electrode substantially.

Further, the processor 60 of the sensing module 500 can select a plurality of sensing electrodes and operate them as the aforementioned first electrodes 12, 14, 16 and 18 and the second electrodes 22, 24, 26 and 28 according to the image data to be displayed by the sensing module 500. That is, operating the electrodes selected from the first set of sensing electrodes 10 to sense touch input during the first period T1 and to sense proximity input during the second period T2. For example, when applying the sensing module to the electronic food ordering system of a fast food restaurant, if there are only two options shown in the food menu, the sensing module 500 will display an image having two areas as the first area 90 and the second area 92 shown in FIG. 5A. However, when the food menu is updated to have six options, as shown in FIG. 5B, the sensing module 500 will select more sensing electrodes to form six areas. Thus, users can perform independent operations to each option of the six areas, respectively. The number of the formed areas and the number of the sensing electrodes to be selected as proximity sensing electrodes are not limited.

Figure 6:
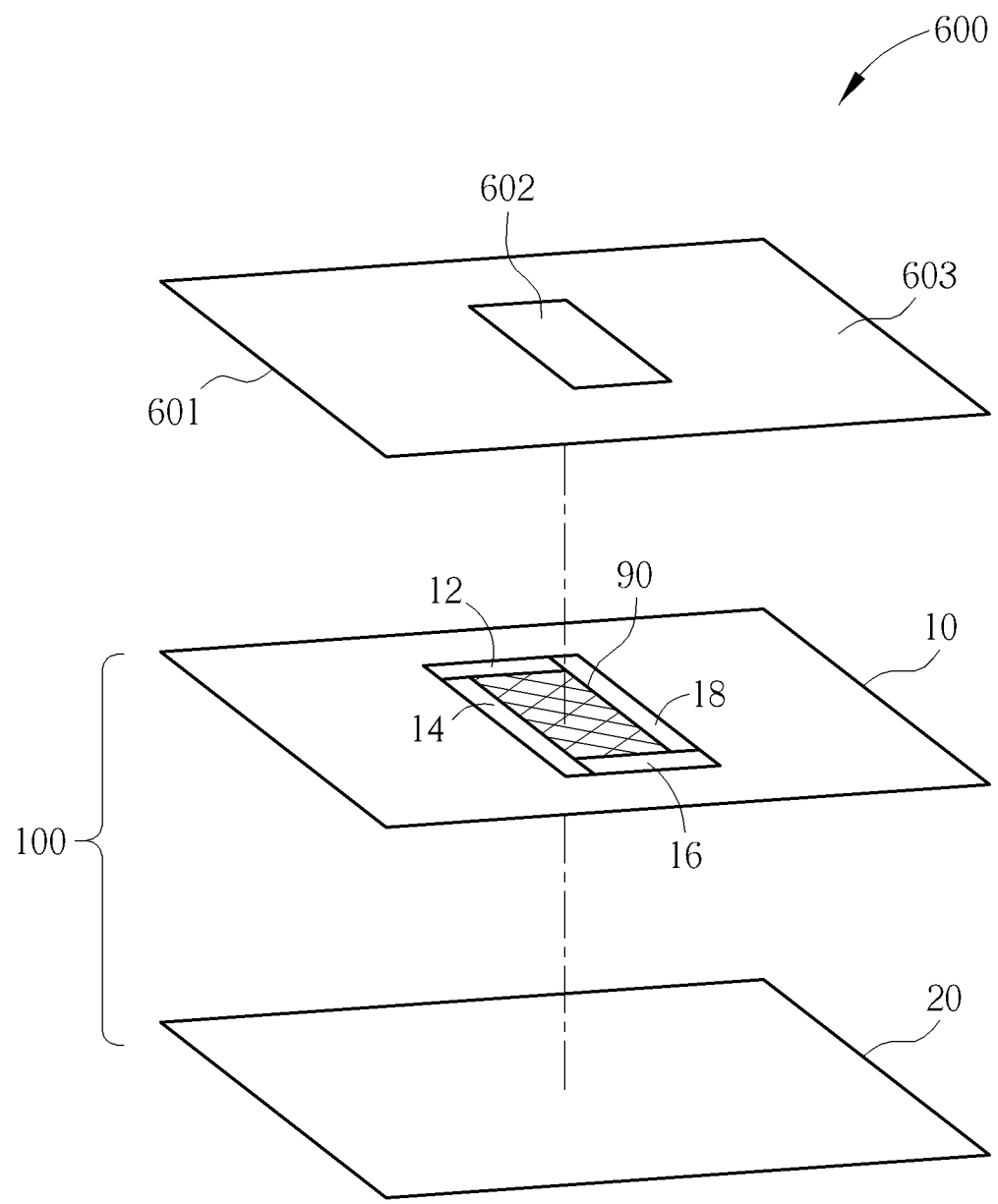
FIG. 6 shows a display integrating the sensing module in FIG. 1 in the fourth embodiment of the present invention.

Please refer to FIG. 6, which shows a display 600 integrating the sensing module 100 in FIG. 1 of the fourth embodiment of the present invention. The display 600 includes functions of sensing touch input and proximity input, and includes a display module 601 and the sensing module 100. The display module 601 is configured to display images, and the sensing module 100 is configured to locate at a side of the display module 601 or to overlap with the display module 601. Similar to the third embodiment, in the fourth embodiment, the display 600 can select a plurality of sensing electrodes according to the image data to be displayed on the display module 601 to form different areas to perform proximity inputs, and the number of the formed areas and the number of the sensing electrodes to be selected as the proximity sensing electrodes are not limited. Besides, the sensing modules illustrated in all the embodiments of the present invention may be applied to displays.

In the display module 601, a command receiving partition 602 and a command non-receiving partition 603 can be determined according to the displayed contents. The first area 90 corresponding to the command receiving partition 602 of the display module 601 are totally or partially overlapped. Besides, when the proximity input is located inside the command receiving partition 602, the display module 601 changes the displayed contents of the display module 601 according to a command predetermined by the command receiving partition 602, and when the proximity input is located inside the command non-receiving partition 603, the display module 601 does not change the displayed contents of the display module 601 with changing of the proximity input.

In other words, in response to the first proximity input located inside the command receiving partition 602, the display module 601 is further configured to change the displayed contents of the display module 601 according to a predetermined command predetermined by the command receiving partition 602, and in response to the proximity input located inside the command non-receiving partition 603, the display module 601 is further configured not to change the displayed contents of the display module 601 in response to the proximity input.

Further, the proximity circuit 50 is further configured to select four first electrodes 12, 14, 16 and 18 from the first set of the sensing electrodes 10, and control the four first electrodes 12, 14, 16 and 18 to sense the proximity input. The first electrodes 12, 14, 16 and 18 determine the first area 90, and the vertical projection of the command receiving partition 602 on the sensing module 100 and the first area 90 are totally or partially overlapped.

Figure 7A:
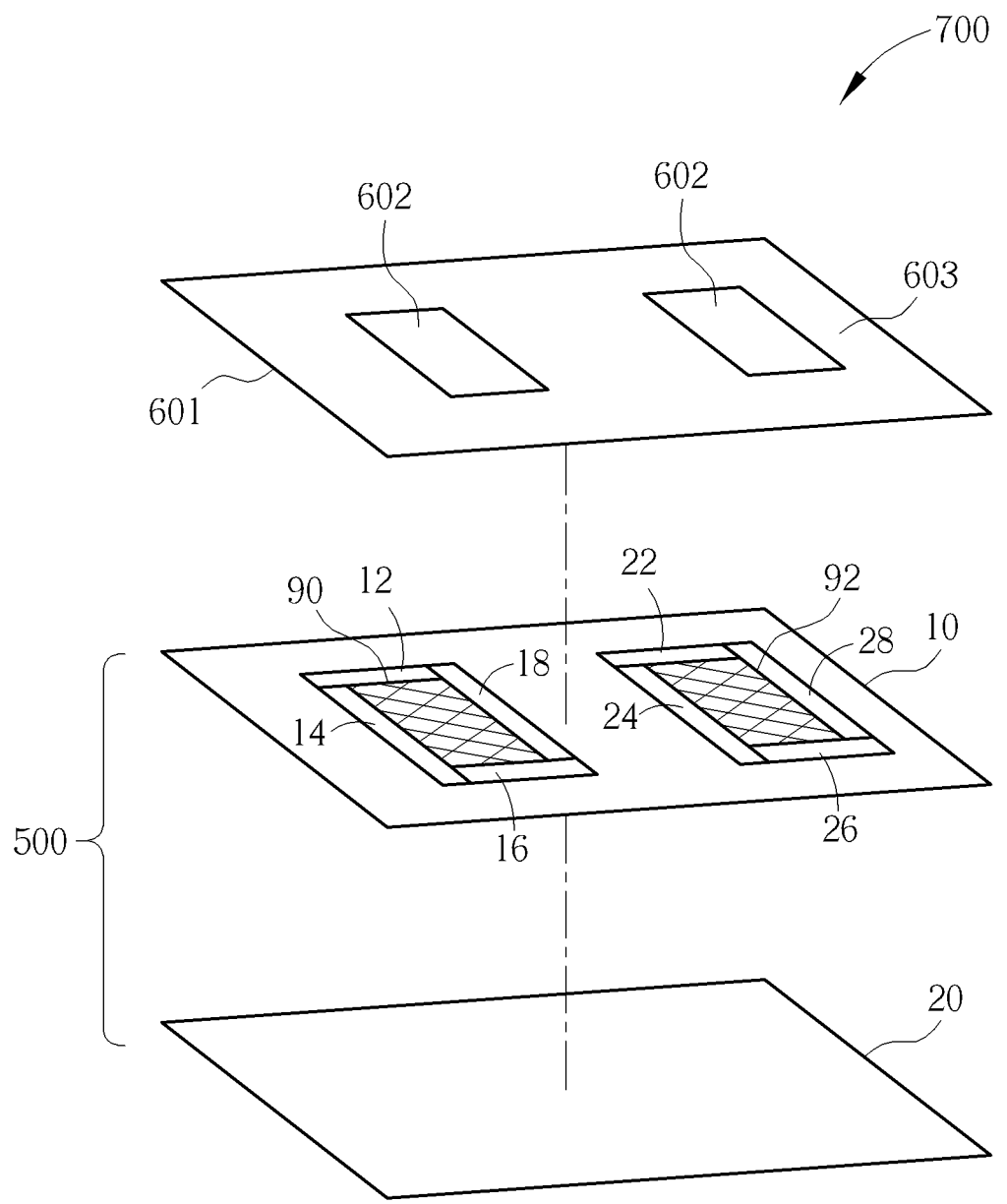
FIG. 7A shows a display integrating the sensing module in FIG. 5A in the fifth embodiment of the present invention.

Please refer to FIG. 7A, which shows a display 700 integrating the sensing module 500 in FIG. 5A of the fifth embodiment of the present invention. The difference between the fourth and fifth embodiments is that, in the fifth embodiment, the sensing module 500 selects the first sensing electrodes 12, 14, 16, 18 and the second sensing electrodes 22, 24, 26, 28 from the first set of sensing electrodes 10, and controls the first sensing electrodes 12, 14, 16, 18 and the second sensing electrodes 22, 24, 26, 28 to sense the proximity input. Besides, the first sensing electrodes 12, 14, 16, 18 and the second sensing electrodes 22, 24, 26, 28 will determine the first area 90 and the second area 92 on the sensing module 500, respectively. The display 700 will determine two command receiving partitions 602 corresponding to the first area 90 and the second area 92 on the display module 601. The vertical projections of the two command receiving partitions 602 on the sensing module 500 are totally or partially overlapped with the first area 90 and the second area 92, respectively. Further, if the display 700 determines more command receiving partitions 602 on the display module 601, the sensing module 500 will select more sensing electrodes from the sensing electrodes 10 to form more corresponding areas accordingly.

Through determining the command receiving partitions 602 in the fourth and fifth embodiments, when a user is performing proximity inputs, even if his hand locates directly above the command non-receiving partition 603, the displays 600 and 700 will not misjudge that the user is performing proximity inputs to the command non-receiving partition 603. Besides, through determining multiple command receiving partitions 602 in the fifth embodiment, the display can sense both multi-points touch inputs and multi-point proximity inputs as shown in the following FIGS. 7B to 7G.

Please refer to FIGS. 7B to 7G, which show performing proximity input to the display 700 in FIG. 7A through gestures. The x, y and z axes are the three axes in three dimensions, and each of the command receiving partitions 602_1, 602_2, 602_3 and 602_4 are formed with four electrodes surrounded. Similar to using two fingers, e.g. thumb and forefinger, to perform touch inputs to a small size touch panel, the display 700 can sense the proximity inputs of the user. If the display 700 is a large size display, e.g. above 32 inches, it would be suitable that the user performs proximity inputs with his hands. If the display 700 is a small size display, e.g. below 10 inches, it would be suitable that the user performs touch inputs with his fingers.

In FIGS. 7B to 7G, the left hand of the user is located right in front of the command receiving partition 602_1 and is apart from the command receiving partition 602_1 by a predetermined distance, and the right hand of the user is located right in front of the command receiving partition 602_2 and is apart from the command receiving partition 602_2 by a predetermined distance.

Figure 7B:
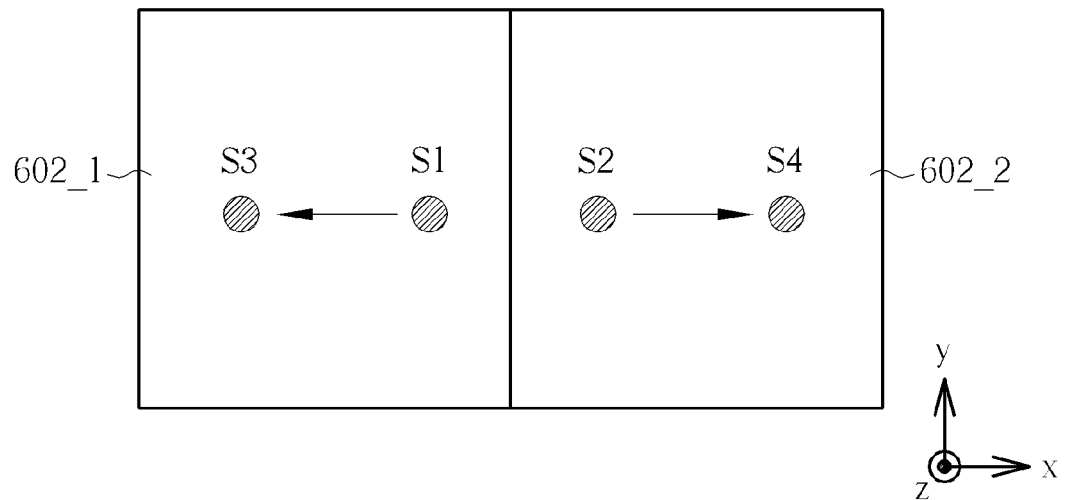
FIGS. 7B to 7G show performing proximity input to the display in FIG. 7A through gestures.

Please refer to FIG. 7B, a command to operate the display 700 to enlarge a portion of the displayed image may be generated through moving the left hand from the position of S1 inside the command receiving partition 602_1 to the position of S3 inside the command receiving partition 602_1 outwardly, and substantially synchronously moving the right hand from the position of S2 inside the command receiving partition 602_2 to the position of S4 inside the command receiving partition 602_2 outwardly.

Figure 7C:
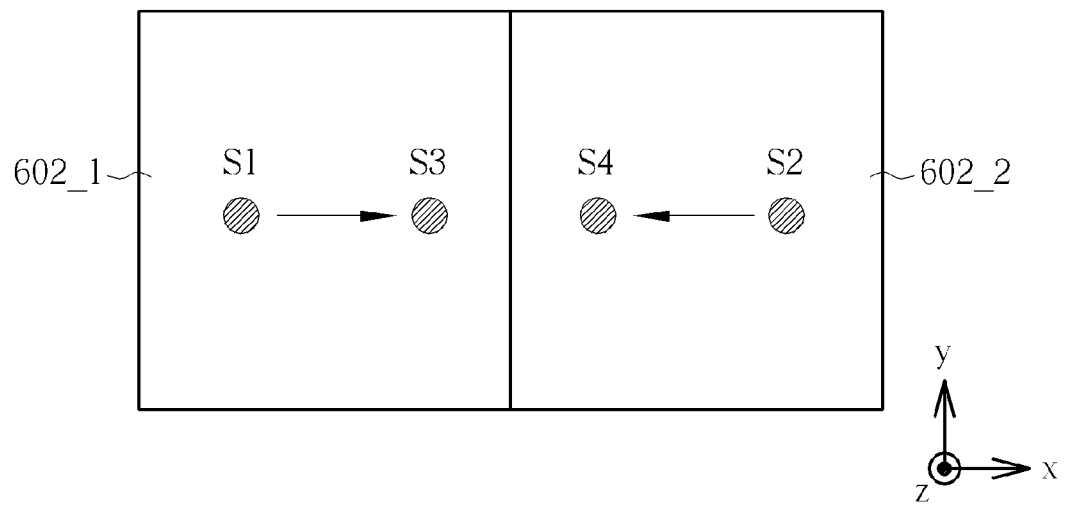

In FIG. 7C, a command to operate the display 700 to shrink a portion of the displayed image may be generated through moving the left hand from the position of S1 to the position of S3 inwardly, and substantially synchronously moving the right hand from the position of S2 to the position of S4 inwardly.

Figure 7D:
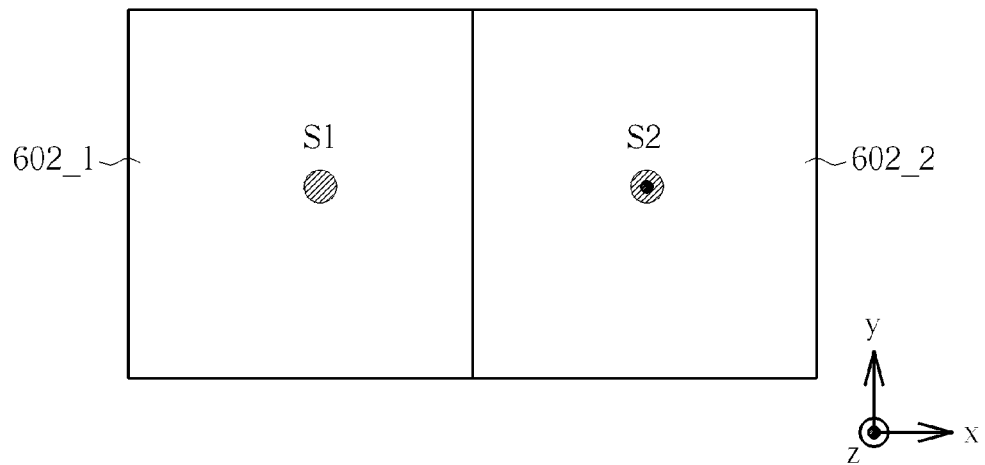

In FIG. 7D, a command to operate the display 700 to shorten the depth of the displayed image may be generated through moving the right hand backward from the position of S2 inside the command receiving partition 602_2 while the left hand remains still at the position of S1 inside the command receiving partition 602_1.

Figure 7E:
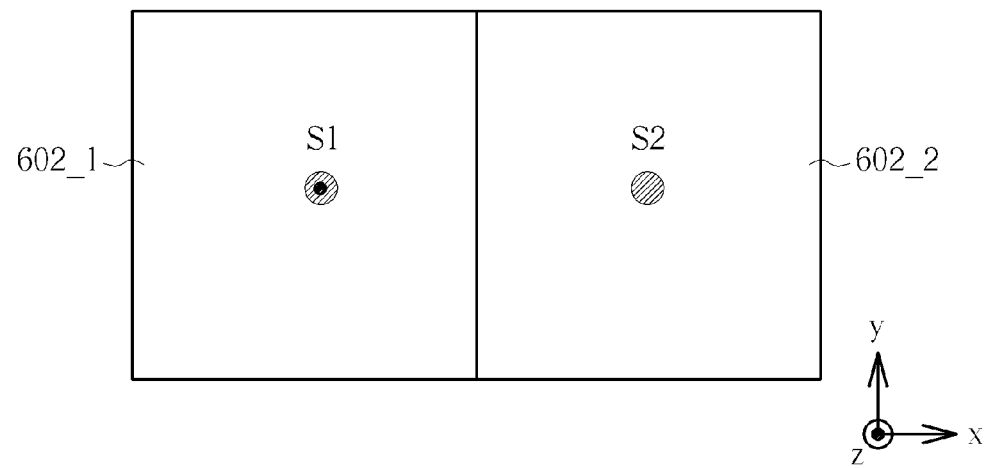

In FIG. 7E, a command to operate the display 700 to elongate the depth of the displayed image may be generated through moving the left hand forward from the position of S1 while the right hand remains still at the position of S2.

Figure 7F:
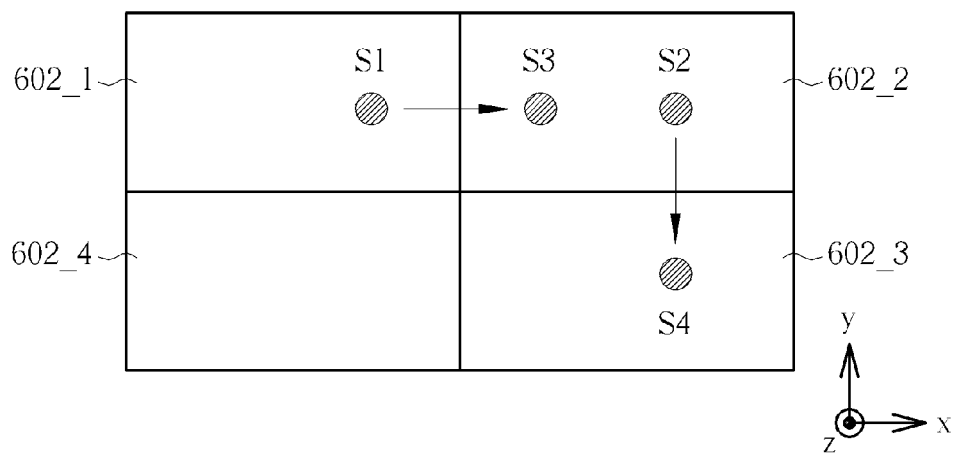

In FIG. 7F, a command to operate the display 700 to clockwise rotate the displayed image may be generated through moving the left hand from the position of S1 inside the command receiving partition 602_1 to the position of S3 inside the command receiving partition 602_2, and substantially synchronously moving the right hand from the position of S2 inside the command receiving partition 602_2 to the position of S4 inside the command receiving partition 602_3.

Figure 7G:
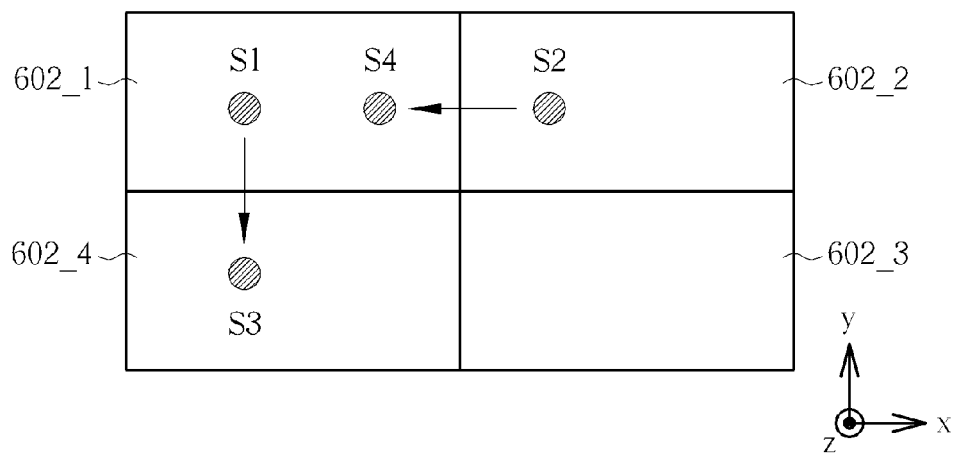

In FIG. 7G, a command to operate the display 700 to counterclockwise rotate the displayed image may be generated through moving the left hand from the position of S1 inside the command receiving partition 602_1 to the position of S3 inside the command receiving partition 602_4, and substantially synchronously moving the right hand from the position of S2 inside the command receiving partition 602_2 to the position of S4 inside the command receiving partition 602_1.

In short, the display 700 can sense proximity inputs and may be operated according to the various gestures provided in FIGS. 7B to 7G. However, the present invention does not limit the gesture types to operate the display 700, and the display 700 can be operated according to more or different gesture types.

Figure 8:
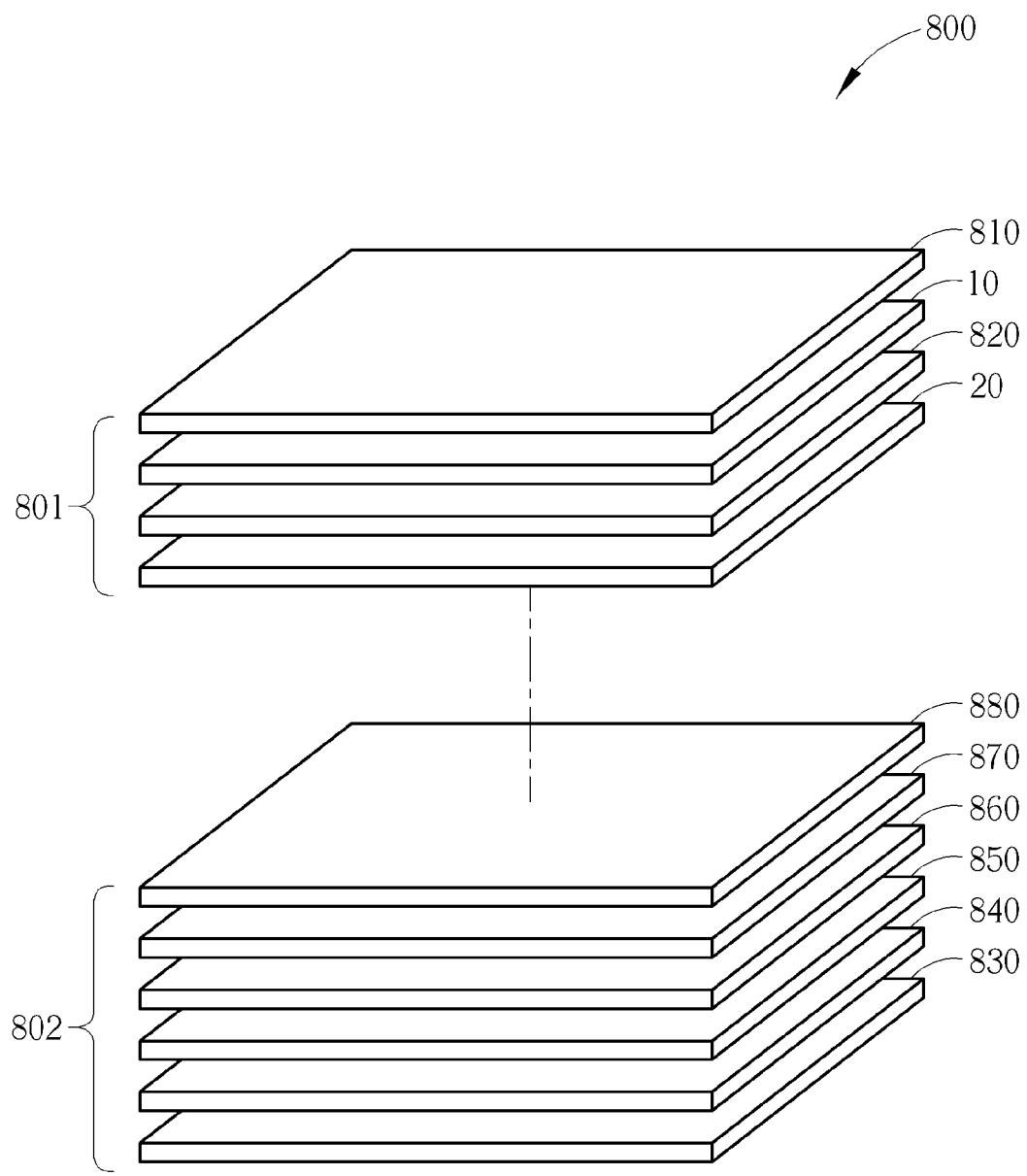
FIG. 8 shows the structure of the display integrating a sensing module of the sixth embodiment of the present invention.

The display structures having multiple sensing electrodes are shown in the following embodiments. FIG. 8 to FIG. 12 show embodiments of detail structures of the sensing modules in FIG. 1 to FIG. 7A and FIG. 13 to FIG. 15 embedded with a display module. Please refer to FIG. 8, which shows the structure of the display integrating a sensing module of the sixth embodiment of the present invention. In FIG. 8, the display structure 800 includes a display module 801 and a sensing module 802. Take LCDs for example, the display module 802 includes a backlight module 830, a first polarization layer 840, a substrate 850, a liquid crystal layer 860, a color filter 870 and a second polarization layer 880. The backlight module 830 is configured to generate backlight, and the first polarization layer 840 is configured at a side of the backlight module 830. The substrate 850 has multiple thin film transistors for controlling each of the pixels to be updated. The substrate 850 is configured at a side of the first polarization layer 840 opposite to the backlight module 830. The liquid crystal layer 60 has multiple liquid crystal cells for controlling the polarizing angles of each pixel, and the liquid crystal layer 60 is configured at a side of the substrate opposite to the first polarization layer 840.

The color filter 870 is configured at a side of the liquid crystal layer 860 opposite to the substrate 850 and the second polarization layer 880 is configured at a side of the color filter 870 opposite to the liquid crystal layer 860. The structure of the sensing module 801 is similar or identical as illustrated in FIG. 2. The sensing module 801 includes the first sensing electrodes 19 and the proximity sensing electrodes 20. The first sensing electrodes 19 includes a plurality of first direction sensing electrodes 17_1 arranged along the y axis at the first plane P1, and a plurality of second direction sensing electrodes 17_2 arranged along the x axis at the second plane P2 other than the first plane P1. The proximity sensing electrode 20 is configured at a side of the first sensing electrodes 19, and located at the plane P3 other than the planes P1 and P2. Although in FIG. 2, the first plane P1, the second plane P2 and the third plane P3 are sequentially arranged along the z axis from the top to the bottom, the present invention does not limit the sequence of the first plane P1, the second plane P2 and the third plane P3.

Besides, the sensing module 801 is stacked with the display module 802. The stack structure of the sensing module 801 and the display module 802 can refer to that the sensing module 801 is configured at a side of the display module 802, or the elements so the sensing module 801 are stacked with the elements of the display module 802. The sensing module further includes a protection layer 810 and a glass layer 820. The protection layer 810 is configured at a side of the first set of sensing electrodes 10, the glass layer 820 is configured at the side of the first set of sensing electrodes 10 opposite to the protection layer 810, and the proximity sensing electrode 20 is configured at the side of the glass layer 820 opposite to the first set of sensing electrodes 10. The proximity sensing electrode 20 is located between the glass layer 820 and the second polarization layer 880. For example, the glass layer 820 may be configured optionally when the first set of sensing electrodes 10 are formed on the surface of the protection layer 820 and facing the display module 802 or formed on the surface of the surface of the display module 802.

More specifically, if the first set of sensing electrodes 10 are formed on one surface of the glass layer 802, the proximity sensing electrode 20 may be formed on the other surface of the glass layer 820. Thus, the stack structure of the sensing module 801 sequentially includes the protection layer 810, the first set of sensing electrodes 10 formed on one surface of the glass layer 820, the glass layer 820 and the proximity sensing electrode 20 formed on the other surface of the glass layer 820.

If the first set of sensing electrodes 10 are formed on the surface of the protection layer 810 facing the display module 802, and the proximity sensing electrode is formed on the surface of the glass layer 820 facing the display module 802, the stack structure of the sensing module 801 sequentially includes the protection layer 810, the first set of sensing electrodes 10 formed on one surface of the protection layer 810 facing the display module 802, the glass layer 820 and the proximity sensing electrode 20 formed on the surface of the glass layer 820 facing the display module 802.

If the first set of sensing electrodes 10 is formed on the surface of the protection layer 810 facing the display module 802, and the proximity sensing electrode 20 is pasted on a polyethylene terephthalate (PET) layer (please refer to the element 930 in FIG. 9), then the polyethylene terephthalate (PET) layer may be pasted with the elements of the sensing module 801. Thus, the stack structure of the sensing module 801 sequentially includes the protection layer 810, the first set of sensing electrodes 10 formed on one surface of the protection layer 810 facing the display module 802, the polyethylene terephthalate (PET) layer, and the proximity sensing electrode 20 formed on the surface of the polyethylene terephthalate (PET) layer.

According to the display structure 800, because the sensing module 801 includes both the first set of sensing electrodes 10 and the proximity electrode 20, the electrode structure of the display structure 800 can provide both the functions of touch and proximity sensing.

Figure 9:
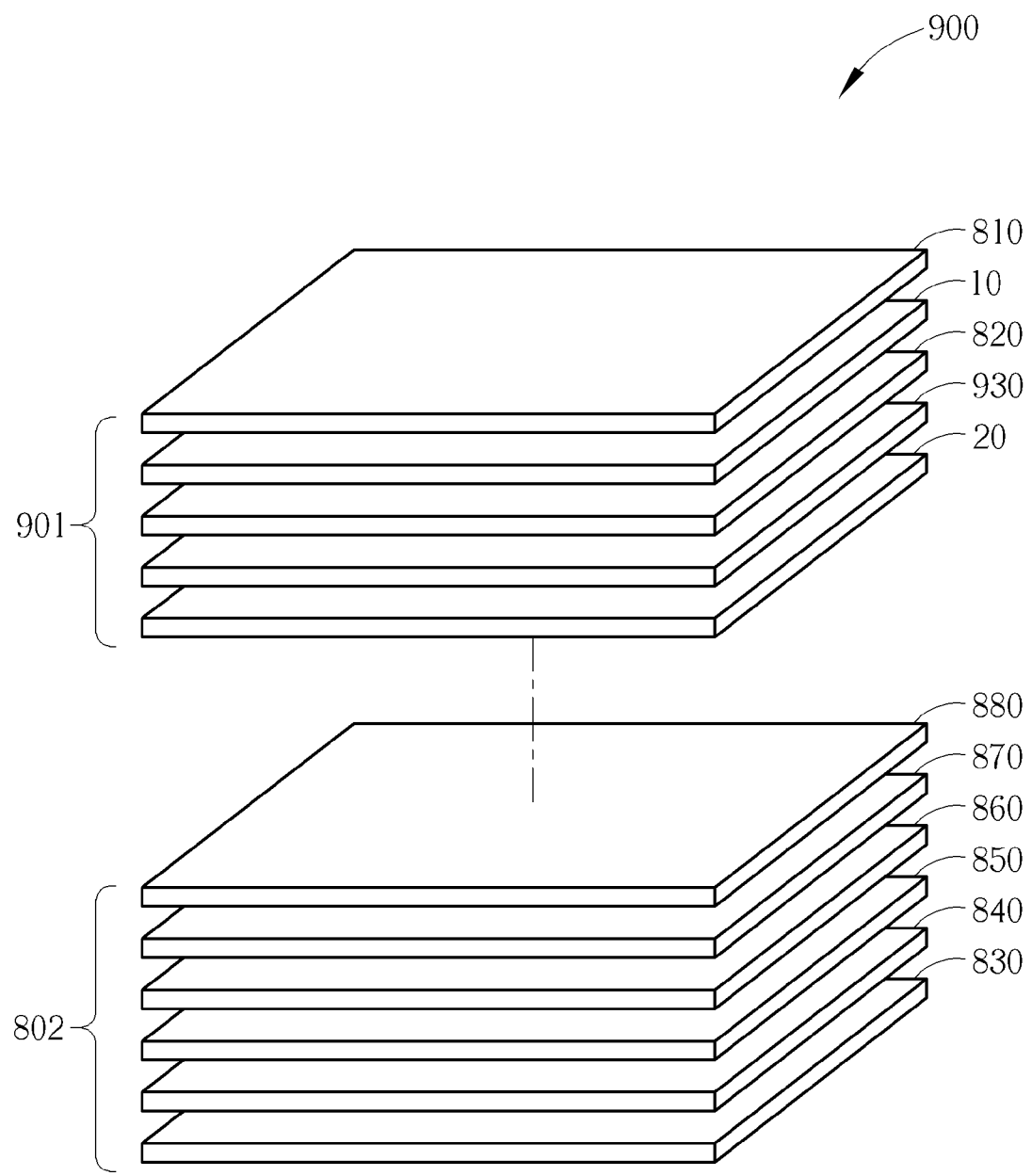
FIG. 9 shows the structure of the display integrating a sensing module of the seventh embodiment of the present invention.

Please refer to FIG. 9, which shows the structure of the display integrating a sensing module of the seventh embodiment of the present invention. As shown in FIG. 9, the difference between the display structures 800 and 900 is that, in the display structure 900, the sensing module 901 further includes a polyethylene terephthalate (PET) layer 930, configured at a side of the glass layer 820 opposite to the first set of sensing electrodes 10, and the proximity sensing electrode 20 is configured on the surface of the polyethylene terephthalate layer 930 opposite to the glass layer 820. Because the sensing module 901 includes both the first set of sensing electrodes 10 and the proximity sensing electrode 20, the display structure 900 provides both the touch and proximity sensing functions without additional proximity sensing devices, thus reducing the overall volume. Besides, when manufacturing the display structure 900, the proximity sensing electrode 20 may be pasted on the polyethylene terephthalate layer 930 in advance, and then the polyethylene terephthalate layer 930 may be pasted with the glass layer 820. That is, the proximity sensing electrode 20 is located between the second polarization layer 880 and the polyethylene terephthalate layer 930, thus the display structure 900 is convenient to be manufactured.

Figure 10:
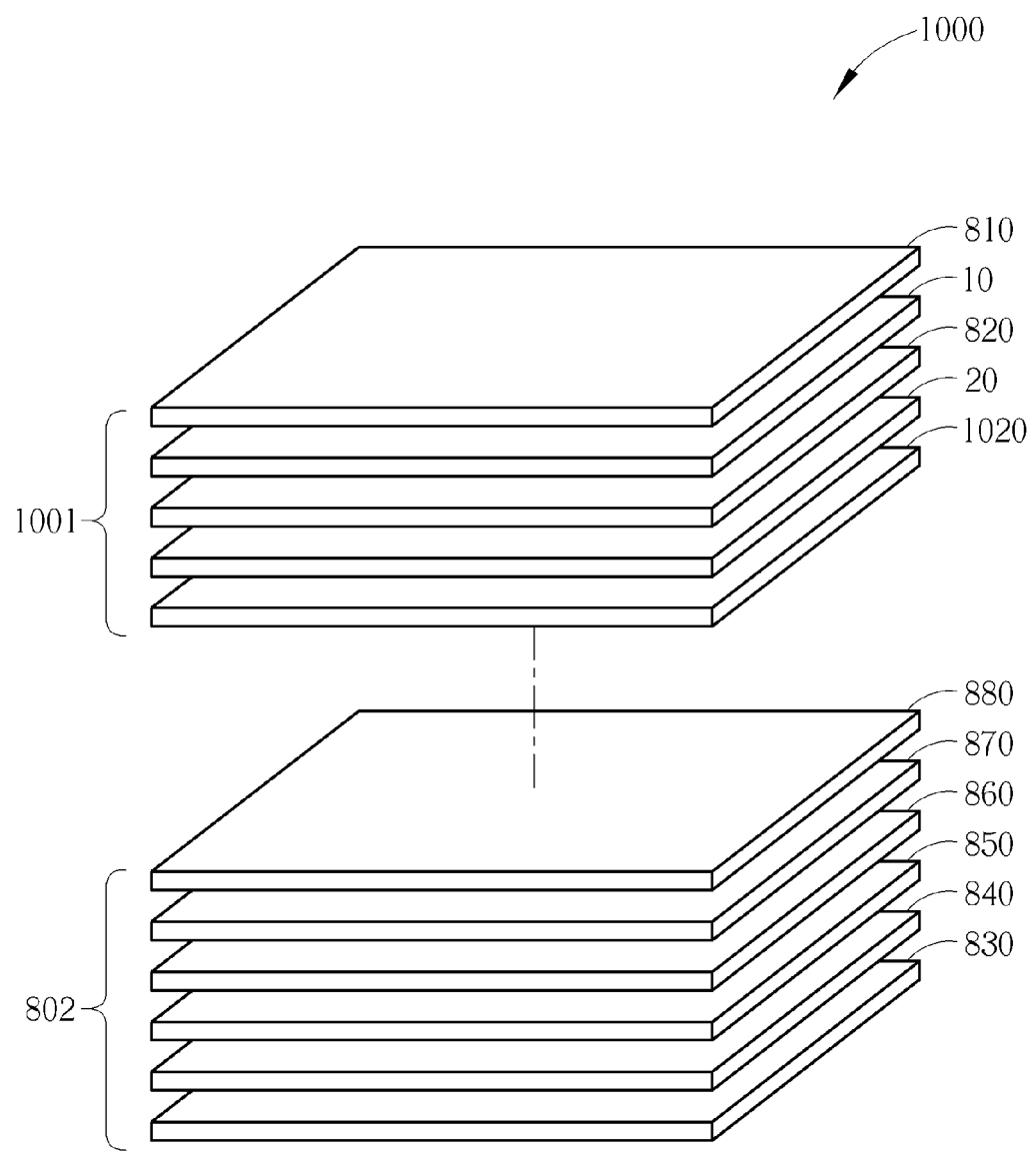
FIG. 10 shows the structure of the display integrating a sensing module of the eighth embodiment of the present invention.

Please refer to FIG. 10, which shows the structure of the display integrating a sensing module of the eighth embodiment of the present invention. As shown in the FIG. 10, the difference between the display structures 800 and 1000 is that, in the display structure 1000, the sensing module 1001 includes another glass layer 1020. The glass layer 1020 is configured at a side of the proximity sensing electrode 20 opposite to glass layer 820, that is, the proximity sensing electrode 20 is configured between the glass layers 820 and 1020. Because the sensing module 1001 includes both the first set of sensing electrodes 10 and the proximity sensing electrode 20, the display structure 1000 provides both the touch and proximity sensing functions without additional proximity sensing devices, thus reducing the overall volume. Besides, when manufacturing the display structure 1000, the proximity sensing electrode 20 may be plated on the glass layer 1020 in advance, and then the glass layer 1020 may be pasted with the glass layer 820, thus the display structure 1000 is convenient to be manufactured.

Figure 11:
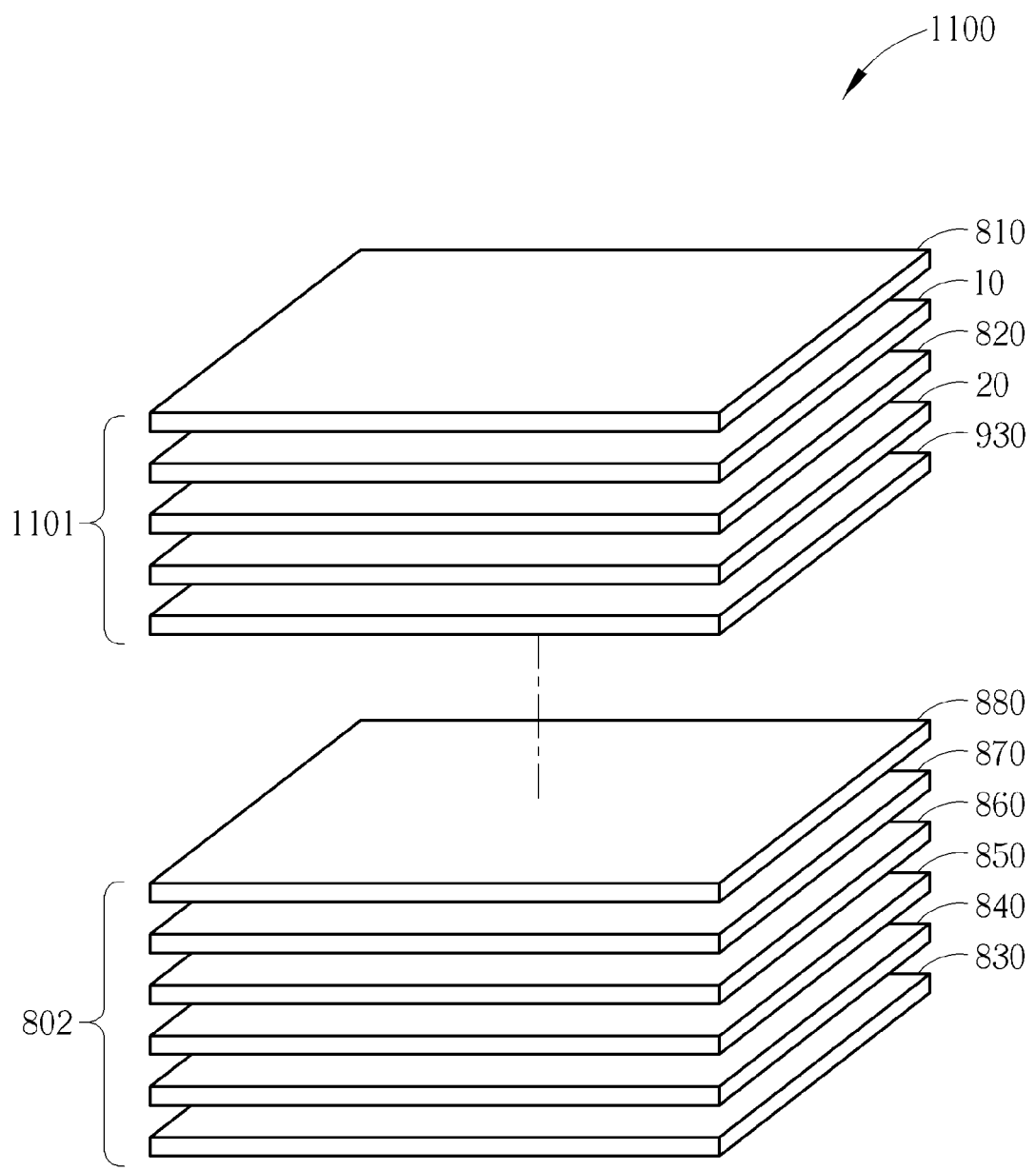
FIG. 11 shows the structure of the display integrating a sensing module of the ninth embodiment of the present invention.

Please refer to FIG. 11, which shows the structure of the display integrating a sensing module of the ninth embodiment of the present invention. As shown in the FIG. 11, the difference between the display structures 900 and 1100 is that, in the display structure 1100, the proximity sensing electrode 20 is formed between the glass layer 820 and the polyethylene terephthalate layer 930, rather than formed between the polyethylene terephthalate layer 930 and the second polarizing layer 880. Similarly, when manufacturing the display structure 1100, the proximity sensing electrode 20 is pasted on the polyethylene terephthalate layer 930 in advance, and then the polyethylene terephthalate layer 930 is pasted with the glass layer 820, thus the display structure 1100 is convenient to be manufactured.

Figure 12:
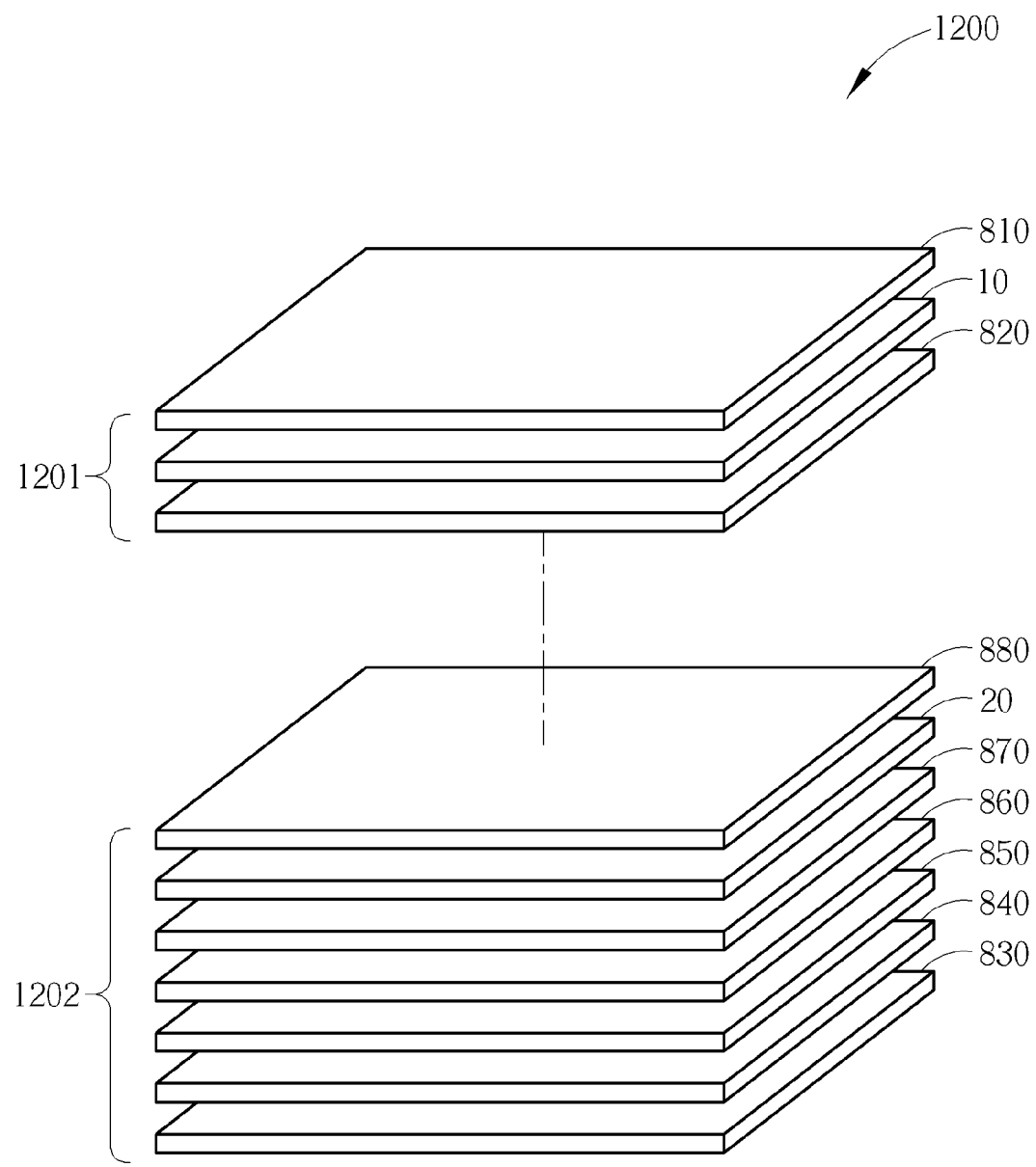
FIG. 12 shows the structure of the display integrating a sensing module of the tenth embodiment of the present invention.

Please refer to FIG. 12, which shows the structure of the display integrating a sensing module of the tenth embodiment of the present invention. As shown in FIG. 12, the difference between the display structures 800 and 1200 is that, in the display structure 1200, the proximity sensing electrode 20 is formed between the color filter 870 and the second polarizing layer 880, rather than formed between the glass layer 820 and the second polarizing layer 880. Because the display structure 1200 includes both the first set of sensing electrodes 10 and the proximity sensing electrode 20, the display structure 1200 provides both the touch and proximity sensing functions without additional proximity sensing devices, thus reducing the overall volume. Besides, when manufacturing the display structure 1200, the proximity sensing electrode 20 may be coated or deposited on the polyethylene color filter 870 first, e.g. the surface of the color filter 870 facing the second polarizing layer 880, and then the color filter 870 may be configured to be between the liquid crystal layer 860 and the second polarizing layer 880, thus the display structure 1200 is convenient to be manufactured.

Figure 13:
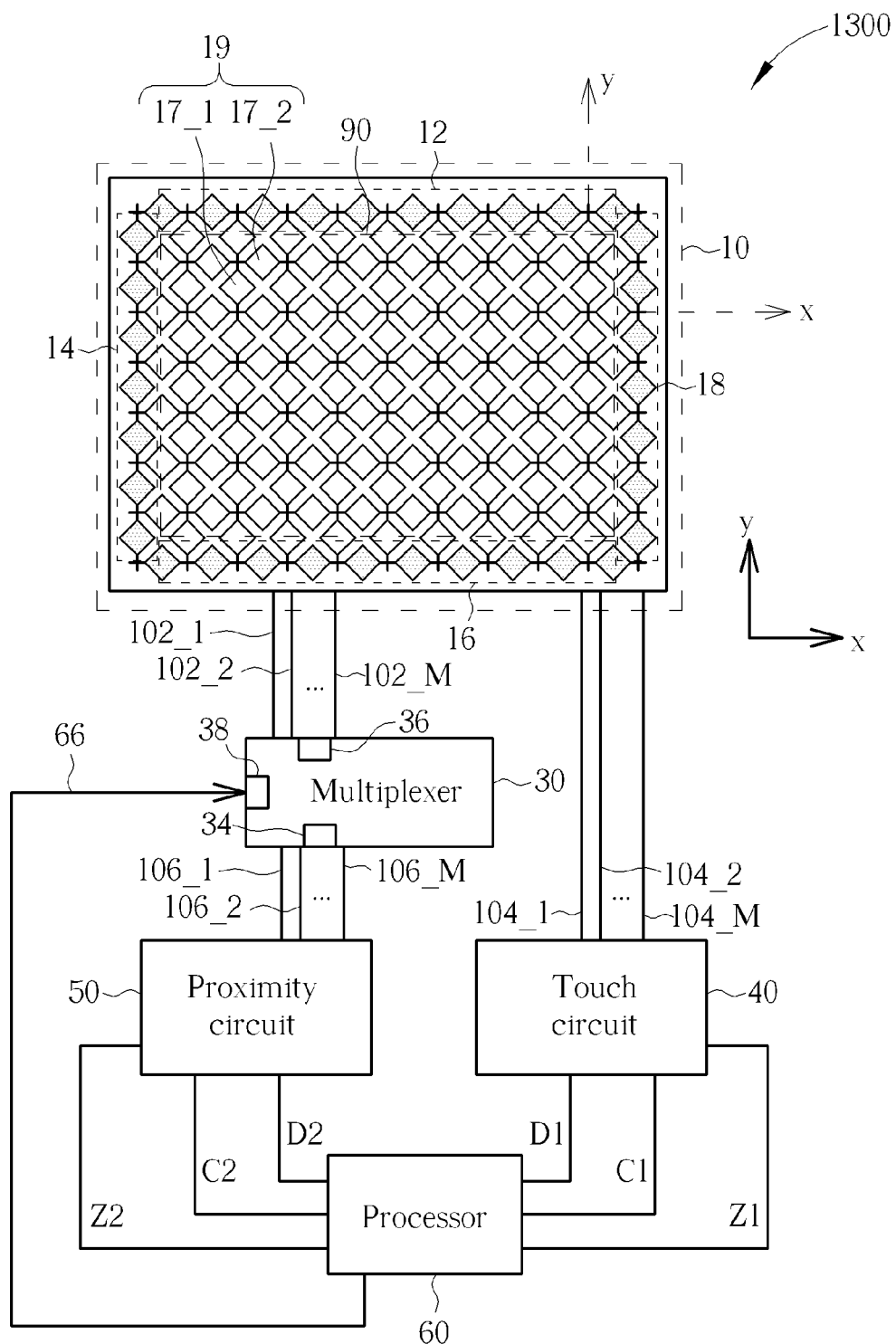
FIG. 13 shows a sensing module of the eleventh embodiment of the present invention.

Please refer to FIG. 13, which shows a sensing module 1300 of the eleventh embodiment of the present invention. As shown in FIG. 13, the difference between the sensing modules 100 and 1300 is that, in the sensing module 1300, the touch circuit 40 is coupled to each electrode of the first set of sensing electrodes 10 directly through the connecting traces 104_1 to 104_M, rather than being coupled to the multiplexer 30 first and then coupling the multiplexer 30 to each electrode of the first set of sensing electrodes 10. Besides, the input end 36 of the multiplexer 30 is coupled to each of first sensing electrodes 19 through the connecting traces 102_1 to 102_M, and the output end 34 is coupled to the proximity circuit 50 through the connecting traces 106_1 to 106_M. Through utilizing the multiplexer 30 in the eleventh embodiment, the first set of sensing electrodes 10 may be coupled to the proximity circuit 50 through the multiplexer 30 during the second period T2, and be isolated from the proximity circuit 50 during the first period T1. For example, after enabling (turning on) the inner switches of the multiplexer 30 in the second period T2, the first set of sensing electrodes 10 will be coupled to the proximity circuit 50, and after disabling (turning off) the inner switches of the multiplexer 30 in the first period T1, the first set of sensing electrodes 10 will be isolated from the proximity circuit 50. Thus, when using the sensing module 1300 to sense proximity inputs only, the touch inputs will not be sensed, thus improving the sensing accuracy.

Figure 14:
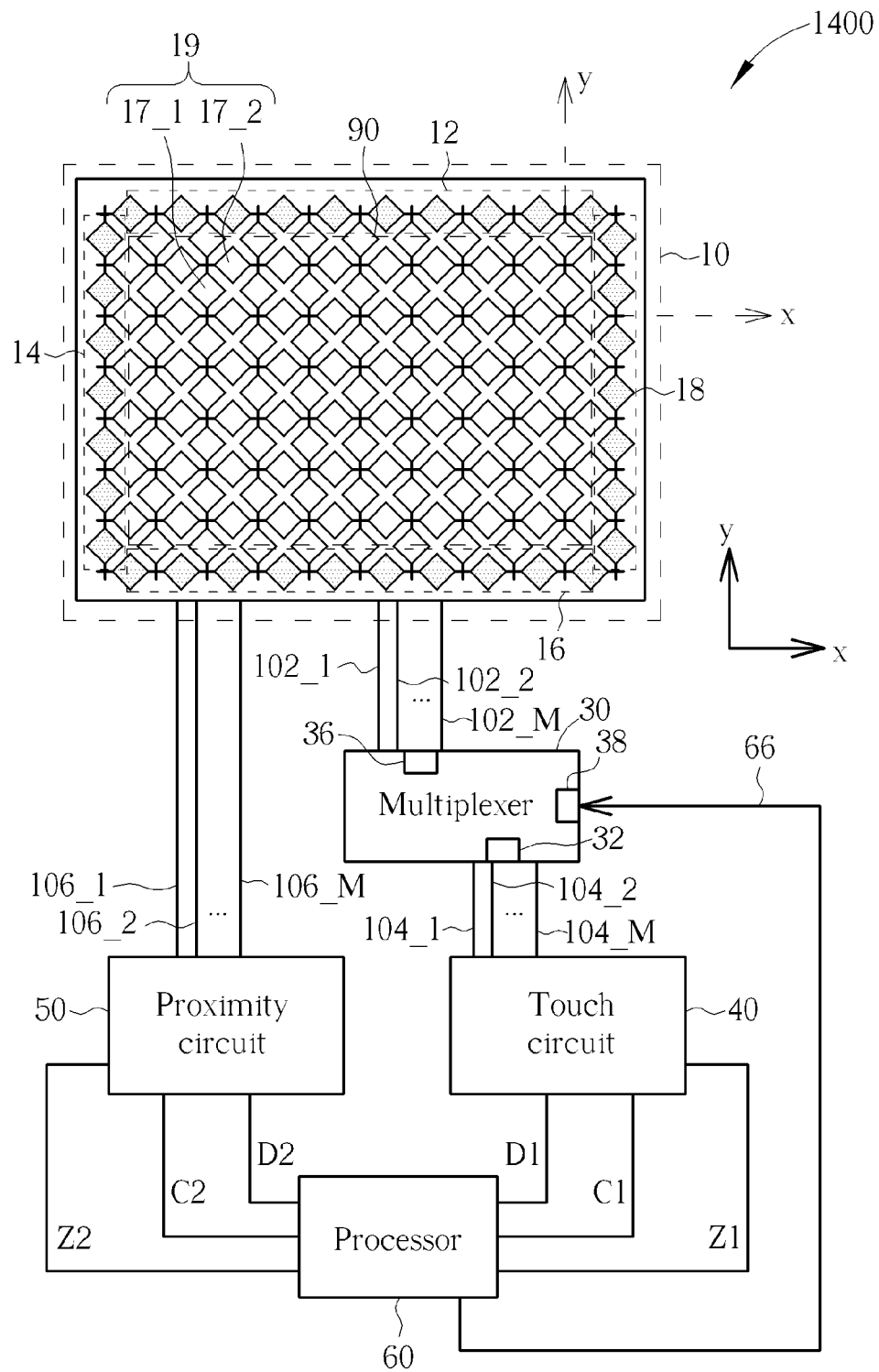
FIG. 14 shows a sensing module of the twelfth embodiment of the present invention.

Please refer to FIG. 14, which shows a sensing module 1400 of the twelfth embodiment of the present invention. As shown in FIG. 14, the difference between the sensing modules 100 and 1400 is that, in the sensing module 1400, the proximity circuit 50 is coupled to each electrode of the first set of sensing electrodes 10 directly through the connecting traces 106_1 to 106_M, rather than being coupled to the multiplexer 30 first and then coupling the multiplexer 30 to each electrode of the first set of sensing electrodes 10. Besides, the input end 36 of the multiplexer 30 is coupled to each of first sensing electrodes 19 through the connecting traces 104_1 to 104_M, and the output end 32 is coupled to the touch circuit 40 through the connecting traces 104_1 to 104_M. Through utilizing the multiplexer 30 in the twelfth embodiment, the first set of sensing electrodes 10 may be coupled to the touch circuit 40 through the multiplexer 30 during the first period T1, and be isolated from the touch circuit 40 during the second period T2. For example, after enabling (turning on) the inner switches of the multiplexer 30 in the first period T1, the first set of sensing electrodes 10 will be coupled to the touch circuit 40, and after disabling (turning off) the inner switches of the multiplexer 30 in the second period T2, the first set of sensing electrodes 10 will be isolated from the touch circuit 40. Thus, when using the sensing module 1400 to sense touch inputs only, the proximity inputs will not be sensed, thus improving the sensing accuracy.

Figure 15:
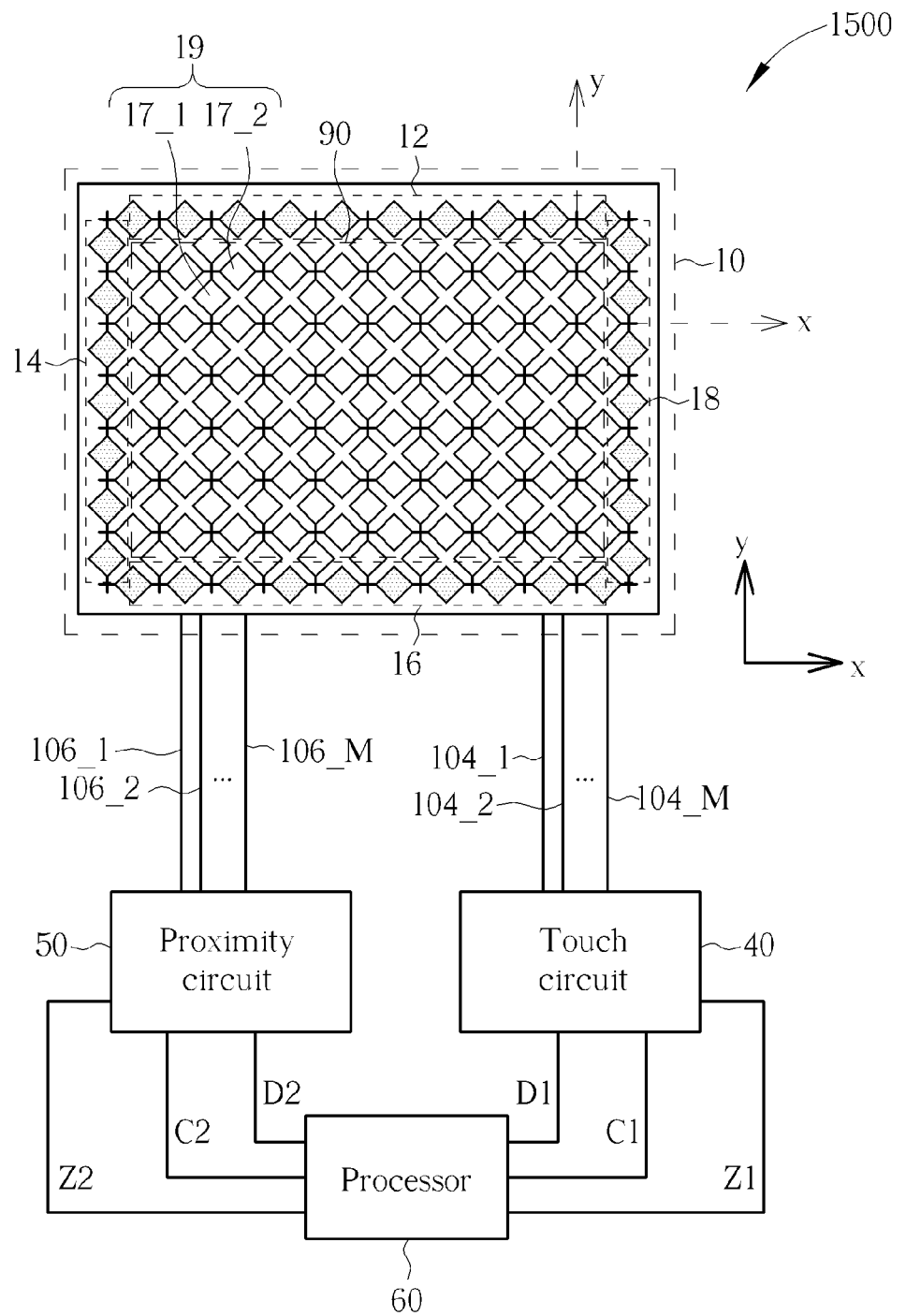
FIG. 15 shows a sensing module of the thirteen embodiment of the present invention.

Please refer to FIG. 15, which shows a sensing module 1500 of the thirteen embodiment of the present invention. As shown in FIG. 15, the difference between the sensing modules 100 and 1500 is that, the sensing module 1500 does not include the multiplexer 30, and the touch circuit 40 and the proximity circuit 50 are coupled to each electrode of the first set of sensing electrodes 10 directly through the connecting traces 104_1 to 104)M and 106_1 to 106_M, respectively. A determining unit may be set in the touch circuit 40 to make the touch circuit 40 only receive the signals belonging to the touch inputs, and will not receive the signals belonging to the proximity inputs. Similarly, a determining unit may be set in the proximity circuit 50 to make the proximity circuit 50 only receive the signals belonging to the proximity inputs, and will not receive the signals belonging to the touch inputs. Besides, in the sensing module 1500, it is possible to disable the touch circuit 40 when the first set of sensing electrodes 10 are driven by the proximity circuit 50 and disable the proximity circuit 50 when the first set of sensing electrodes 10 are driven by the touch circuit 40, in order to make the touch circuit 40 and the proximity circuit 50 to respectively sense the touch and proximity inputs through the first set of sensing electrodes 10. Compared with the sensing module 100, the overall volume of the sensing module 1500 is smaller.

According to the devices and methods provides in the embodiments of the present invention, the sensing modules 100, 400, 500, 801, 901, 1001, 1300, 1400 and 1500 include both the functions of sensing touch and proximity inputs. Thus, by utilizing the sensing modules 100, 400, and 500, the problem of the related art that the bacteria is transferred between many users through directly touching touch panels can be reduced via performing proximity inputs while allowing touch inputs to also be performed when high accuracy inputs are required. Further, through selecting sensing electrodes from the first set of sensing electrodes 10, the sensing modules 100, 400, 500, 801, 901, 1001, 1300, 1400 and 1500 can be divided into multiple areas, e.g. the first area 90 and the second area 92, thus the user can perform multi-point proximity inputs accordingly. Moreover, since the display structures 800, 900, 1000, 1100 and 1200 have both functions of sensing proximity and touch inputs, the additional proximity sensing devices are not needed, thus reducing the overall volume, and the display structures 900, 1000, 1100 and 1200 are also more convenient to be manufactured. Furthermore, the accuracy of sensing proximity inputs of the sensing module 1300 is improved, the accuracy of sensing touch inputs of the sensing module 1400 is improved, and the overall volume of the sensing module 1500 is reduced. Besides, in the embodiments of the present invention, the time division multiplexing function is applied to the first set of sensing electrodes 10 such that the first set of sensing electrodes 10 can be used as touch or proximity sensing electrodes at different timings. Since some electrodes have both touch and proximity sensing functions, the space required to contain electrodes in a circuit can be saved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display capable of touch and proximity sensing, comprising:
    a display module for displaying images;
    a sensing module, stacked with the display module, the sensing module comprising:
        a proximity sensing electrode;
        a first set of sensing electrodes, comprising a plurality of first sensing electrodes configured at a side of the proximity sensing electrode for sensing a touch input during a first period to provide an analog touch signal for indicating a location of the touch input in two dimensions, and sensing a first proximity input with four first electrodes and the proximity sensing electrode during a second period to provide an analog proximity signal for indicating a location of the proximity input in three dimensions, wherein the four first electrodes are selected from the first sensing electrodes, and the four first electrodes determine a first area on the sensing module;
    a touch circuit coupled to the first sensing electrodes of the first set of sensing electrodes for controlling the first sensing electrodes to sense the touch input during the first period, receiving the analog touch signal, and converting the analog touch signal to a digital touch signal;
    a proximity circuit coupled to the first sensing electrodes of the first set of the sensing electrodes and the proximity sensing electrode for controlling the four first electrodes and the proximity sensing electrode to sense the first proximity input, receiving the analog proximity signal, and converting the analog proximity signal to a digital proximity signal; and
    a processor coupled to the touch circuit and the proximity circuit for generating corresponding commands according to the digital touch signal and the digital proximity signal.

2. The display of claim 1, further comprising a multiplexer having an input end electrically coupled to each first sensing electrode of the first set of sensing electrodes, a first output end electrically coupled to the touch circuit, and a selecting end electrically coupled to the processor, and the processor further being configured to control the multiplexer to make the first set of sensing electrodes electrically coupled to the touch circuit through the multiplexer during the first period, and electrically isolated from the touch circuit during the second period.

3. The display of claim 2, wherein a second output end of the multiplexer is electrically coupled to the proximity circuit, and the first set of sensing electrodes is electrically coupled to the proximity circuit through the multiplexer during the first period and is electrically isolated from the touch circuit during the second period.

4. The display of claim 1, further comprising a multiplexer, having an input end electrically coupled to each first sensing electrode of the first set of sensing electrodes, a second output end electrically coupled to the proximity circuit, and a selecting end electrically coupled to the processor, and the processor further being configured to control the multiplexer to make the first set of sensing electrodes electrically coupled to the proximity circuit through the multiplexer during the second period, and electrically isolated from the touch circuit during the first period.

5. The display of claim 1, wherein the processor is further configured to select the four first electrodes according to displayed contents of the display module.

6. The method of claim 5, wherein:
    a command receiving partition and a command non-receiving partition are determined at the display module according to the displayed contents, wherein the first area determined by the four first electrodes and the command receiving area are totally or partially overlapped; and
    in response to the first proximity input located inside the command receiving partition, the display module is further configured to change the displayed contents of the display module according to a predetermined command of the command receiving partition, and in response to the first proximity input located inside the command non-receiving partition, the display module is further configured not to change the displayed contents of the display module in response to the first proximity input.

7. The display of claim 5, wherein:
    two command receiving partitions are determined at the display module according to the displayed contents, in response to the first proximity input located at one of the command receiving partitions, the display module is configured to change the contents of the display module according to a predetermined command of the command receiving partition corresponding to the location of the first proximity input, and in response to the first proximity input located outside the two command receiving partitions, the display module is further configured not to change the displayed contents of the display module in response to the first proximity input; and
    the proximity circuit is further configured to select four electrodes other than the four first electrodes from the first set of the sensing electrodes as four second electrodes, and control the four first electrodes and the four second electrodes to sense the first proximity input according to the displayed contents of the display module during the second period, wherein the four second electrodes determines a second area other than the first area at the sensing module, and the first area and the second area are corresponding to the command receiving partitions individually and totally or partially overlap the corresponding command receiving partition.

8. The display of claim 1, wherein the sensing module further comprises:

a second set of sensing electrodes having a plurality of second sensing electrodes, wherein each second sensing electrode is electrically coupled to the proximity circuit.

9. The display of claim 1, wherein the proximity circuit is further configured to select four electrodes other than the first electrodes from the first set of the sensing electrodes as four second electrodes, and control the four first electrodes and the for second electrodes to sense the first proximity input and a second proximity input respectively, and the four second electrodes determine a second area not overlapped with the first area on the sensing module.

10. The display of claim 9, wherein the processor is further configured to generate a corresponding multipoint command according to the first proximity input and the second proximity input.

11. The display of claim 9, wherein the processor controls a duration ratio of the first period and the second period according to whether the first sensing electrodes sense the touch input.

12. The display of claim 11, wherein in response to the first set of sensing electrodes sensing the touch input, the processor is configured to increase the proportion of the first period in the duration ratio, and in response to the first set of sensing electrodes not sensing the touch input, the processor is configured to increase the proportion of the second period in the duration ratio to delay the time of the first period switching to the second period.

13. The display of claim 1, wherein:
the first sensing electrodes are a plurality of first direction sensing electrodes arranged along a first direction in array on a first plane and a plurality of second direction sensing electrodes arranged along a second direction in array on a second plane other than the first plane; and
the proximity electrode is configured at a third plane at a side of the second plane opposite to the first plane.

14. The display of claim 1, wherein the sensing module further comprises:
a first clock signal line and a first data line, electrically coupled between the touch circuit and the processor;
a second clock signal line and a second data line, electrically coupled between the proximity circuit and the processor;
a first interrupting signal line, electrically coupled between the touch circuit and the processor, for notifying the processor after the touch circuit transmitting the digital touch signal; and
a second interrupting signal line, electrically coupled between the proximity circuit and the processor, for notifying the processor after the proximity circuit transmitting the digital proximity signal.

15. A display structure having sensing electrodes, comprising:
a display module; and
a sensing module, stacked with the display module, the sensing module comprising:
a first set of sensing electrodes, comprising:
a plurality of first direction sensing electrodes arranged along a first direction; and
a plurality of second direction sensing electrodes arranged along a second direction other than the first direction; and
a proximity sensing electrode, configured at a side of the first set of sensing electrodes, and located at a plane other than a plane where the first set of sensing electrodes is located.

16. The display structure of claim 15, wherein:
the display module comprises:
a backlight module for generating backlight;
a first polarization layer configured at a side of the backlight module;
a substrate having multiple thin film transistors, configured at a side of the first polarization layer opposite to the backlight module;
a liquid crystal layer having multiple liquid crystal cells, configured at a side of the substrate opposite to the first polarization layer;
a color filter, configured at a side of the liquid crystal layer opposite to the substrate; and
a second polarization layer, configured at a side of the color filter opposite to the liquid crystal layer; and
the sensing module further comprises:
a protection layer, configured at a side of the first set of sensing electrodes; and
a glass layer, configured at a side of the first set of sensing electrodes opposite to the protection layer;
wherein the proximity sensing electrode is configured at a side of the glass layer opposite to the first set of sensing electrodes, and the proximity sensing electrode is located between the glass layer and the second polarization layer.

17. The display structure of claim 15, wherein:
the display module comprises:
a backlight module for generating backlight;
a first polarization layer configured at a side of the backlight module;
a substrate having multiple thin film transistors, configured at a side of the first polarization opposite to the backlight module;
a liquid crystal layer having multiple liquid crystal cells, configured at a side of the substrate opposite to the first polarization;
a color filter, configured at a side of the liquid crystal layer opposite to the substrate; and
a second polarization layer, configured at a side of the color filter opposite to the liquid crystal layer; and
the sensing module further comprises:
a protection layer, configured at a side of the first set of sensing electrodes;
a glass layer, configured at a side of the first set of sensing electrodes opposite to the protection layer; and
a polyethylene terephthalate (PET) layer, configured at a side of the glass layer opposite to the first set of sensing electrodes;
wherein the proximity sensing electrode is configured on the surface of the polyethylene terephthalate layer and located between the second polarization layer and the polyethylene terephthalate layer.

18. The display structure of claim 15, wherein:
the display module comprises:
a backlight module for generating backlight;
a first polarization layer configured at a side of the backlight module;
a substrate having multiple thin film transistors, configured at a side of the first polarization opposite to the backlight module;
a liquid crystal layer having multiple liquid crystal cells, configured at a side of the substrate opposite to the first polarization;
a color filter, configured at a side of the liquid crystal layer opposite to the substrate; and
a second polarization layer, configured at a side of the color filter opposite to the liquid crystal layer; and the sensing module further comprises:
  a protection layer, configured at a side of the first set of sensing electrodes;
  a first glass layer, configured at a side of the first set of sensing electrodes opposite to the protection layer; and
  a second glass layer, configured at a side of the proximity sensing electrode opposite to first glass layer, and located between the proximity sensing electrode and the second polarization layer;
wherein the proximity sensing electrode is configured at the surface of the second glass layer.

19. The display structure of claim 15, wherein:
the display module comprises:
  a backlight module for generating backlight;
  a first polarization layer configured at a side of the backlight module;
  a substrate having multiple thin film transistors, configured at a side of the first polarization opposite to the backlight module;
  a liquid crystal layer having multiple liquid crystal cells, configured at a side of the substrate opposite to the first polarization;
  a color filter, configured at a side of the liquid crystal layer opposite to the substrate; and
  a second polarization layer, configured at a side of the color filter opposite to the liquid crystal layer; and
the sensing module further comprises:
  a protection layer, configured at a side of the first set of sensing electrodes;
  a glass layer, configured at a side of the first set of sensing electrodes opposite to the protection layer; and
  a polyethylene terephthalate (PET) layer, configured at a side of the proximity electrode opposite to the glass layer;
wherein the proximity sensing electrode is configured on the surface of the polyethylene terephthalate layer, and the polyethylene terephthalate layer is located between the second polarization layer and the proximity sensing electrode.

20. The display structure of claim 15, wherein:
the display module comprises:
  a backlight module for generating backlight;
  a first polarization layer configured at a side of the backlight module;
  a substrate having multiple thin film transistors, configured at a side of the first polarization opposite to the backlight module;
  a liquid crystal layer having multiple liquid crystal cells, configured at a side of the substrate opposite to the first polarization;
  a color filter, configured at a side of the liquid crystal layer opposite to the substrate; and
  a second polarization layer, configured at a side of the color filter opposite to the liquid crystal layer; and
the sensing module further comprises:
  a protection layer, configured at a side of the first set of sensing electrodes; and
  a glass layer, configured at a side of the first set of sensing electrodes opposite to the protection layer;
wherein the proximity sensing electrode is configured between the color filter and the second polarization layer, and is configured at the surface of the color filter toward the second polarization layer.

21. The display structure of claim 15, wherein:
the display module comprises:
  a backlight module for generating backlight;
  a first polarization layer configured at a side of the backlight module;
  a substrate having multiple thin film transistors, configured at a side of the first polarization opposite to the backlight module;
  a liquid crystal layer having multiple liquid crystal cells, configured at a side of the substrate opposite to the first polarization;
  a color filter, configured at a side of the liquid crystal layer opposite to the substrate; and
  a second polarization layer, configured at a side of the color filter opposite to the liquid crystal layer; and
the sensing module further comprises:
  a protection layer, configured at a side of the first set of sensing electrodes, wherein the first set of sensing electrodes are configured at the surface of the protection layer toward the display module, and the proximity sensing electrode is configured between the second polarization layer and the first set of sensing electrodes.

\* \* \* \* \*

UNITED STATES PATENT AND TRADEMARK OFFICE
CERTIFICATE OF CORRECTION

PATENT NO.           : 8,878,808 B2
APPLICATION NO.      : 13/798167
DATED                : November 4, 2014
INVENTOR(S)          : Chi-Cheng Chen et al.

It is certified that error appears in the above-identified patent and that said Letters Patent is hereby corrected as shown below:

On the title page, item (72), correct the citizenship of the third inventor from "Kyaw Kyaw Tun, Hsin-Chu (TV)" to --Kyaw Kyaw Tun, Hsin-Chu (TW)--.

Signed and Sealed this
Twenty-first Day of July, 2015

Michelle K. Lee
*Director of the United States Patent and Trademark Office*